(12) United States Patent
Sasaki et al.

(10) Patent No.: US 6,687,096 B2
(45) Date of Patent: Feb. 3, 2004

(54) THIN-FILM MAGNETIC HEAD AND METHOD OF MANUFACTURING SAME

(75) Inventors: Yoshitaka Sasaki, Chuo-ku (JP); Nobuya Oyama, Tokyo (JP)

(73) Assignee: TDK Corporation, Tokyo (JP)

( * ) Notice: Subject to any disclaimer, the term of this patent is extended or adjusted under 35 U.S.C. 154(b) by 127 days.

(21) Appl. No.: 09/879,005

(22) Filed: Jun. 13, 2001

(65) Prior Publication Data

US 2002/0024776 A1 Feb. 28, 2002

(30) Foreign Application Priority Data

Jun. 21, 2000 (JP) ........................................ 2000-186296
Jun. 21, 2000 (JP) ........................................ 2000-186779

(51) Int. Cl.[7] ............................................. G11B 5/127
(52) U.S. Cl. ...................................... 360/317; 360/126
(58) Field of Search ................................. 360/126, 317

(56) References Cited

U.S. PATENT DOCUMENTS 5,438,747 A    8/1995  Krounbi et al.
5,473,491 A   12/1995  Fujisawa et al.
6,156,375 A * 12/2000  Hu et al. ..................... 427/116
6,456,459 B1 *  9/2002  Sasaki ......................... 360/126
6,483,665 B1 * 11/2002  Sasaki ......................... 360/126

FOREIGN PATENT DOCUMENTS

JP   SHO 60-10409    1/1985
JP   SHO 62-245509  10/1987
JP   A 6-314413     11/1994
JP   A 7-262519     10/1995

* cited by examiner

Primary Examiner—David L. Ometz
Assistant Examiner—Mark Blouin
(74) Attorney, Agent, or Firm—Oliff & Berridge, PLC

(57) ABSTRACT

A write head incorporates a bottom pole layer and a top pole layer that include pole portions, and a write gap layer disposed between the pole portion of the bottom pole layer and the pole portion of the top pole layer. The write head further incorporates a thin-film coil at least a part of which is located between the bottom pole layer and the top pole layer and insulated from these pole layers. Each of the bottom pole layer and the top pole layer includes a pole portion layer and a yoke portion layer. An end of each of the yoke portion layers facing toward an air bearing surface is located at a distance from the air bearing surface.

26 Claims, 21 Drawing Sheets

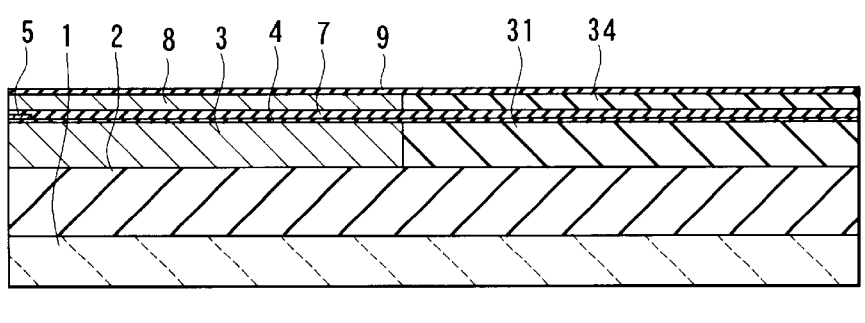
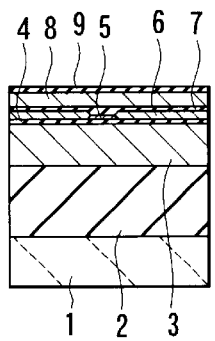
FIG. 26A  FIG. 26B
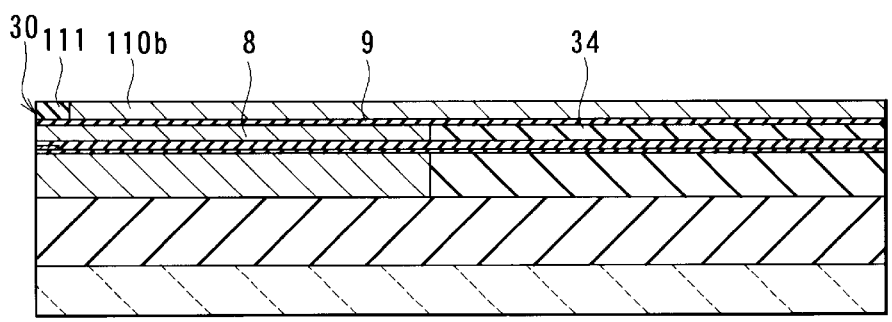
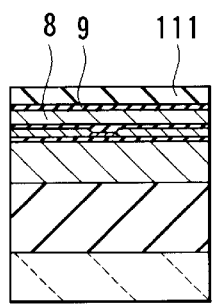
FIG. 27A  FIG. 27B

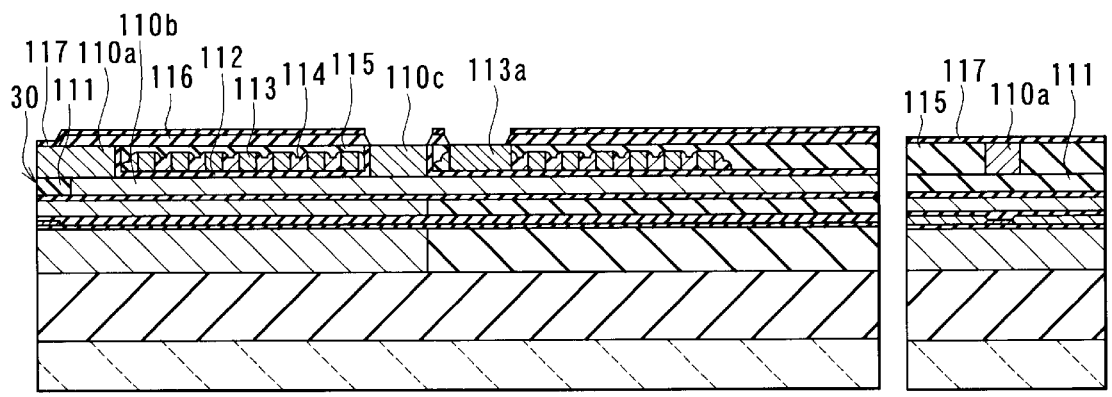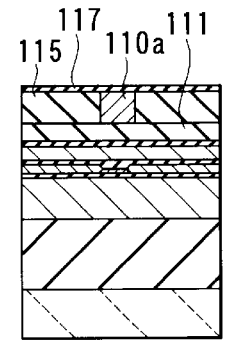
FIG. 30A  FIG. 30B
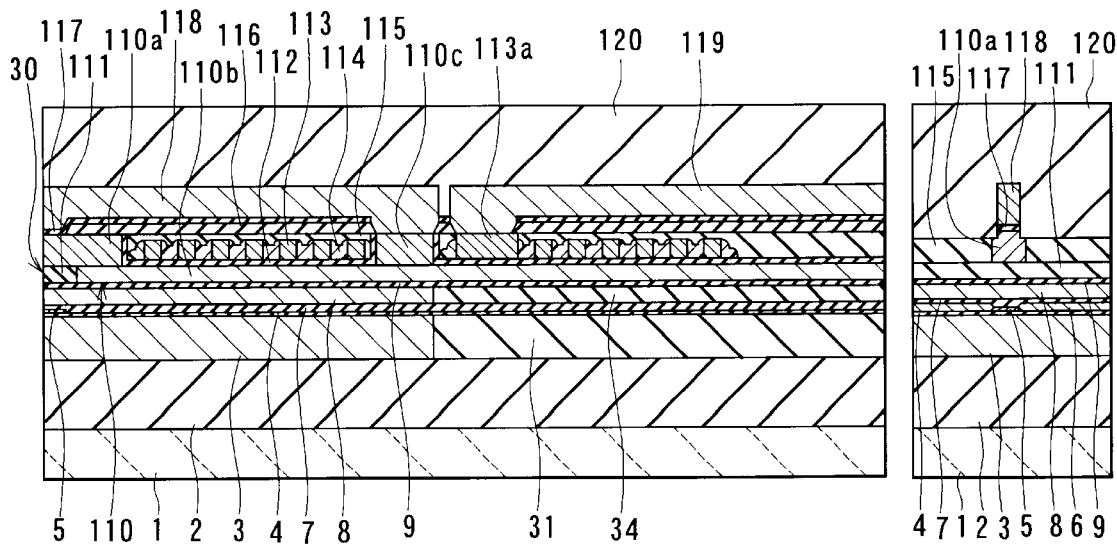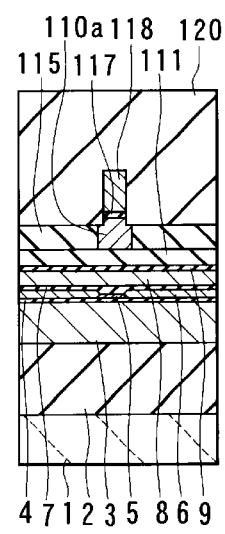
FIG. 31A  FIG. 31B

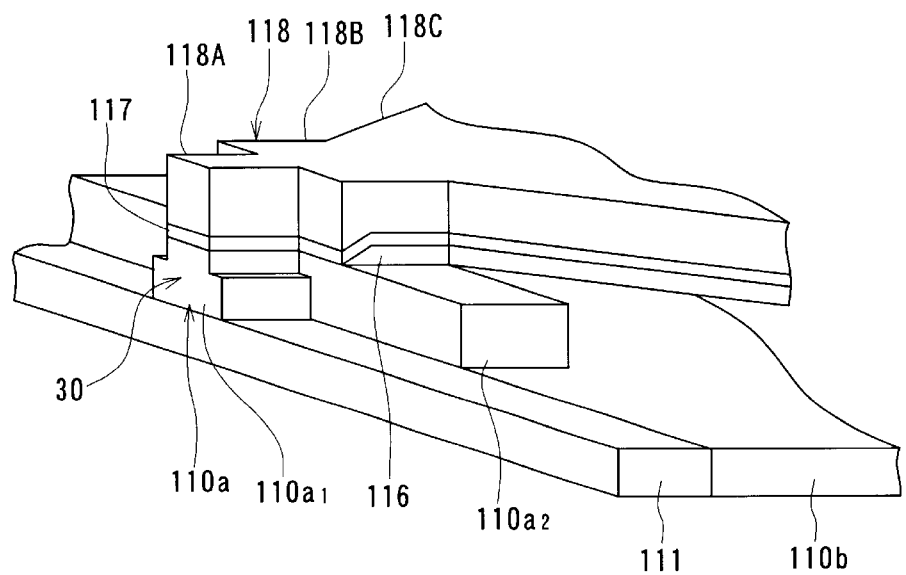
FIG. 32
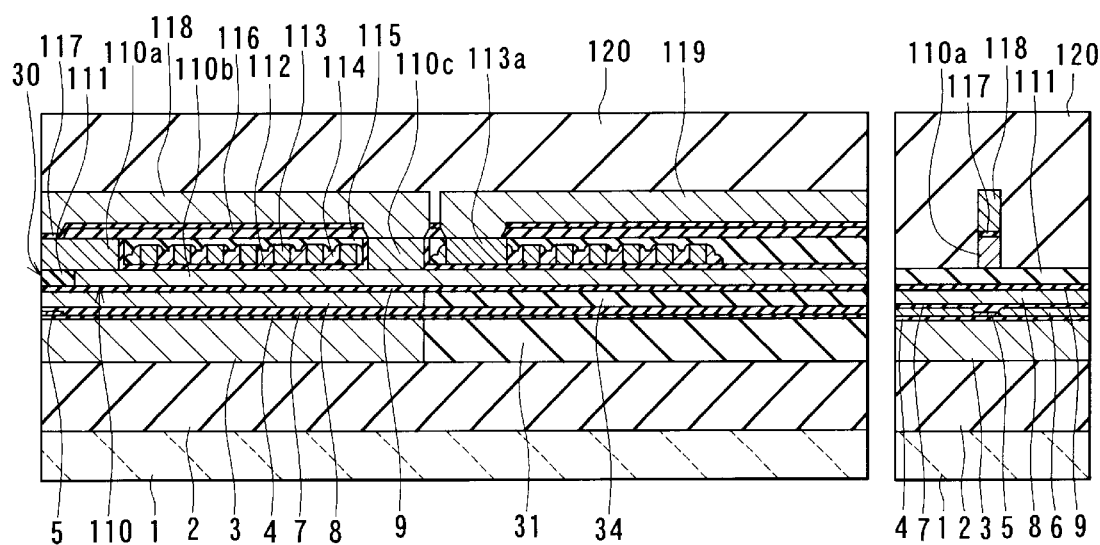
FIG. 33A
FIG. 33B

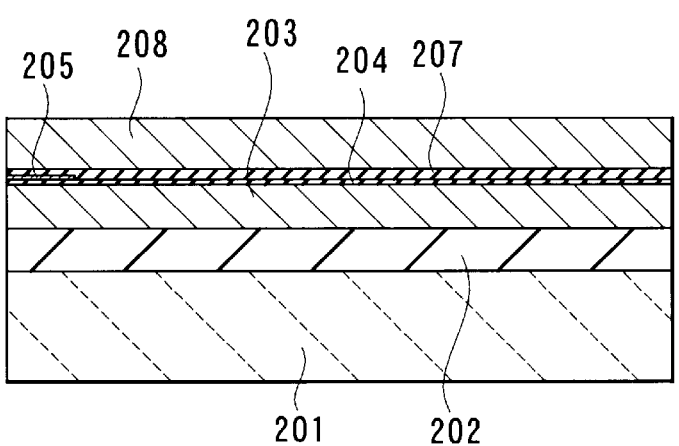
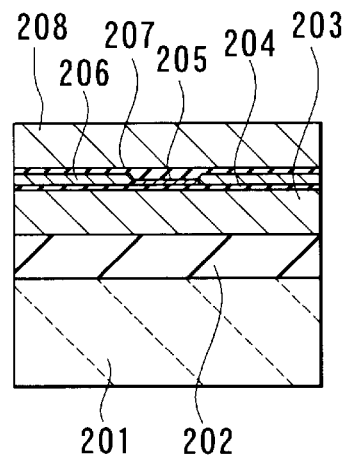
FIG. 34A
RELATED ART
FIG. 34B
RELATED ART
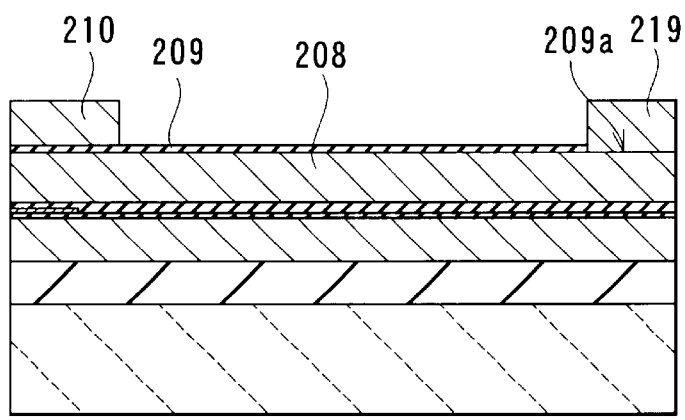
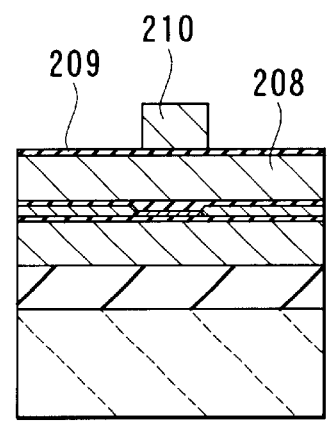
FIG. 35A
RELATED ART
FIG. 35B
RELATED ART

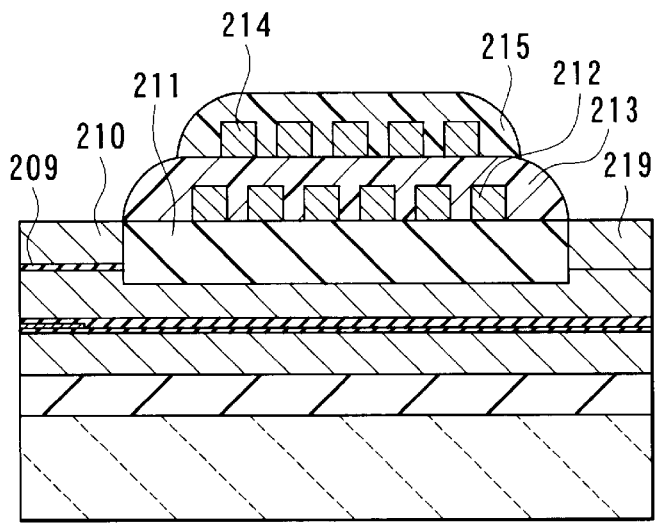
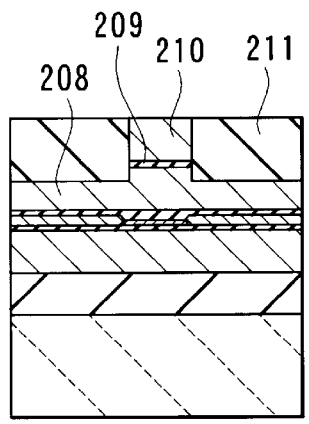
FIG. 36A
RELATED ART
FIG. 36B
RELATED ART
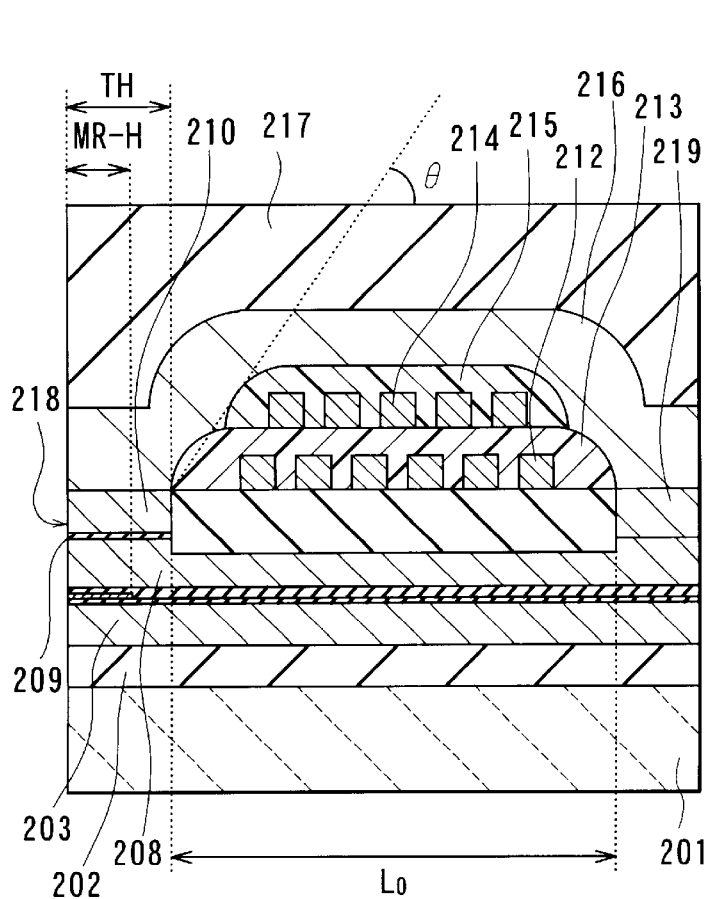
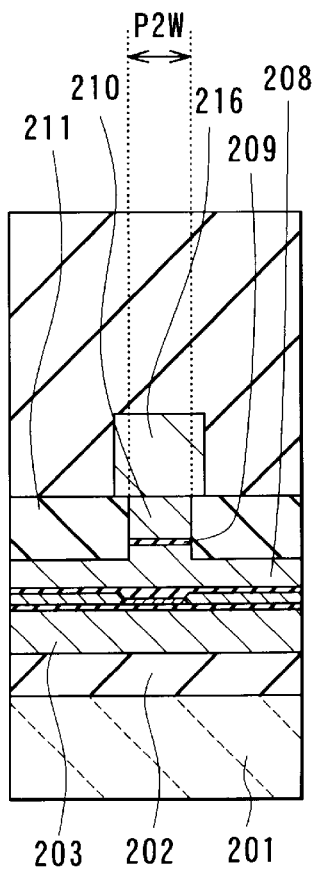
FIG. 37A
RELATED ART
FIG. 37B
RELATED ART

THIN-FILM MAGNETIC HEAD AND METHOD OF MANUFACTURING SAME

BACKGROUND OF THE INVENTION

1. Field of the Invention

The present invention relates to a thin-film magnetic head having at least an induction-type electromagnetic transducer and a method of manufacturing such a thin-film magnetic head.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a write (recording) head having an induction-type electromagnetic transducer for writing and a read (reproducing) head having a magnetoresistive (MR) element for reading.

It is required to increase the track density on a magnetic recording medium in order to increase recording density among the performance characteristics of a write head. To achieve this, it is required to implement a write head of a narrow track structure wherein the width of top and bottom poles sandwiching the write gap layer on a side of the air bearing surface is reduced down to microns or the order of submicron. Semiconductor process techniques are utilized to implement such a structure.

Reference is now made to FIG. 34A to FIG. 37A and FIG. 34B to FIG. 37B to describe an example of a method of manufacturing a composite thin-film magnetic head as an example of a method of manufacturing a thin-film magnetic head of related-art. FIG. 34A to FIG. 37A are cross sections each orthogonal to an air bearing surface of the thin-film magnetic head. FIG. 34B to FIG. 37B are cross sections of pole portions of the head each parallel to the air bearing surface.

In the manufacturing method, as shown in FIG. 34A and FIG. 34B, an insulating layer 202 made of alumina ($Al_2O_3$), for example, having a thickness of about 5 to 10 $\mu$m is deposited on a substrate 201 made of aluminum oxide and titanium carbide ($Al_2O_3$—TiC), for example. On the insulating layer 202 a bottom shield layer 203 made of a magnetic material is formed for making a read head.

Next, on the bottom shield layer 203, alumina, for example, is deposited to a thickness of 100 to 200 nm through sputtering to form a bottom shield gap film 204 as an insulating layer. On the bottom shield gap film 204 an MR element 205 for reading having a thickness of tens of nanometers is formed. Next, a pair of electrode layers 206 are formed on the bottom shield gap film 204. The electrode layers 206 are electrically connected to the MR element 205.

Next, a top shield gap film 207 is formed as an insulating layer on the bottom shield gap film 204 and the MR element 205. The MR element 205 is embedded in the shield gap films 204 and 207.

Next, on the top shield gap film 207, a top-shield-layer-cum-bottom-pole-layer (called a bottom pole layer in the following description) 208 having a thickness of about 3 $\mu$m is formed. The bottom pole layer 208 is made of a magnetic material and used for both a write head and a read head.

Next, as shown in FIG. 35A and FIG. 35B, on the bottom pole layer 208, a write gap layer 209 made of an insulating film such as an alumina film whose thickness is 0.2 $\mu$m is formed. Next, a portion of the write gap layer 209 is etched to form a contact hole 209a to make a magnetic path. On the write gap layer 209 in the pole portion, a top pole tip 210 made of a magnetic material and having a thickness of 0.5 to 1.0 $\mu$m is formed for the write head. At the same time, a magnetic layer 219 made of a magnetic material is formed for making the magnetic path in the contact hole 209a for making the magnetic path.

Next, as shown in FIG. 36A and FIG. 36B, the write gap layer 209 and the bottom pole layer 208 are etched through ion milling, using the top pole tip 210 as a mask. As shown in FIG. 36B, the structure is called a trim structure wherein the sidewalls of the top pole (the top pole tip 210), the write gap layer 209, and part of the bottom pole layer 208 are formed vertically in a self-aligned manner.

Next, an insulating layer 211 made of an alumina film, for example, and having a thickness of about 3 $\mu$m is formed on the entire surface. The insulating layer 211 is then polished to the surfaces of the top pole tip 210 and the magnetic layer 219 and flattened.

Next, on the flattened insulating layer 211, a first layer 212 of a thin-film coil is made of copper (Cu), for example, for the induction-type write head. Next, a photoresist layer 213 is formed into a specific shape on the insulating layer 211 and the first layer 212. Heat treatment is then performed at a specific temperature to flatten the surface of the photoresist layer 213. On the photoresist layer 213, a second layer 214 of the thin-film coil is then formed. Next, a photoresist layer 215 is formed into a specific shape on the photoresist layer 213 and the second layer 214. Heat treatment is then performed at a specific temperature to flatten the surface of the photoresist layer 215.

Next, as shown in FIG. 37A and FIG. 37B, a top pole layer 216 is formed for the write head on the top pole tip 210, the photoresist layers 213 and 215, and the magnetic layer 219. The top pole layer 216 is made of a magnetic material such as Permalloy. Next, an overcoat layer 217 of alumina, for example, is formed to cover the top pole layer 216. Finally, machine processing of the slider including the foregoing layers is performed to form the air bearing surface 218 of the thin-film magnetic head including the write head and the read head. The thin-film magnetic head is thus completed.

FIG. 38 is a top view of the thin-film magnetic head shown in FIG. 37A and FIG. 37B. The overcoat layer 217 and the other insulating layers and insulating films are omitted in FIG. 38.

In FIG. 37A, 'TH' indicates the throat height and 'MR-H' indicates the MR height. The throat height is the length (height) of portions of magnetic pole layers facing each other with the write gap layer in between, between the air-bearing-surface-side end and the other end. The MR height is the length (height) between the air-bearing-surface-side end of the MR element and the other end. In FIG. 37B, 'P2W' indicates the pole width, that is, the write track width. In addition to the throat height, the MR height and so on, the apex angle as indicated with θ in FIG. 37A is one of the factors that determine the performance of a thin-film magnetic head. The apex is a hill-like raised portion of the coil covered with the photoresist layers 213 and 215. The apex angle is the angle formed between the top surface of the insulating layer 211 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 37A and FIG. 37B.

To achieve high areal recording density, that is, to fabricate a write head with a narrow track structure, it has been particularly required that track width P2W fall within the submicron order of 1.0 µm or smaller. It is therefore required to process the top pole into the submicron order through semiconductor process techniques.

A problem is that it is difficult to form the top pole layer having small dimensions on the apex.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 µm or greater. The photoresist whose thickness is 3 to 4 µm is applied to cover the apex. If the photoresist thickness is required to be at least 3 µm over the apex, a photoresist film having a thickness of 8 to 10 µm or greater, for example, is formed below the apex since the fluid photoresist goes downward.

To implement a write track width of the submicron order as described above, it is required to form a frame pattern having a width of the submicron order through the use of a photoresist film. Therefore, it is required to form a fine pattern of the submicron order on top of the apex through the use of a photoresist film having a thickness of 8 to 10 µm or greater. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may go out of shape. It is therefore impossible to obtain a sharp and precise photoresist pattern.

As thus described, it is difficult in prior art to fabricate the top pole layer with accuracy if the pole width of the submicron order is required.

To overcome the problems thus described, a method has been taken, as shown in the foregoing example of related-art manufacturing steps illustrated in FIG. 35A to FIG. 37A and FIG. 35B to FIG. 37B. In this method, a track width of 1.0 µm or smaller is formed through the use of the top pole tip 210 effective for making a narrow track of the write head. The top pole layer 216 to be a yoke portion connected to the top pole tip 210 is then fabricated (as disclosed in Published Unexamined Japanese Patent Application Showa 62-245509 [1987] and Published Unexamined Japanese Patent Application Showa 60-10409 [1985]). That is, the ordinary top pole layer is divided into the top pole tip 210 and the top pole layer 216 to be the yoke portion in this method. As a result, it is possible that the top pole tip 210 that defines the write track width is formed to have small dimensions to some degree on the flat top surface of the write gap layer 209.

In Published Unexamined Japanese Patent Application Heisei 6-314413, a thin-film magnetic head is disclosed in which each of the top pole layer and the bottom pole layer is made up of two layers that are a layer including the pole portion and a layer to be the yoke portion.

However, in the thin-film magnetic head shown in FIG. 37A and FIG. 37B, and in the head disclosed in Published Unexamined Japanese Patent Application Heisei 6-314413, the end face of the layer to be the yoke portion is exposed from the air bearing surface. As a result, writing may be performed by the thin-film magnetic head not only on a side of the layer including the pole portion but also on a side of the layer to be the yoke portion, and so-called 'side write' may result, that is, data is written in a region of a recording medium where data is not supposed to be written.

In the thin-film magnetic head disclosed in Published Unexamined Japanese Patent Application Heisei 6-314413, the portions of the total of four layers located in the pole portions, that is, the two layers of the top pole layer and the two layers of the bottom pole layer, have equal widths. To form the portions of the four layers located in the pole portions that have equal widths, each of the layers may be formed such that the shape of the portion of each of the layers located in the pole portions is determined when each of the layers is fabricated. Alternatively, the four layers may be formed and then etched at the same time such that the portions of the four layers located in the pole portions have equal widths.

However, if each of the layers is formed such that the shape of the portion of each of the layers located in the pole portions is determined when each of the layers is fabricated, it is difficult to determine the shape of the portion of each of the layers located in the pole portions with accuracy and to align the portions of the layers located in the pole portions with accuracy, particularly when the write track width is reduced.

If the four layers are etched at the same time, it takes a long time to etch and it is difficult to determine the shapes of the portions of the four layers located in the pole portions with accuracy.

Furthermore, in a prior-art thin-film magnetic head, it is difficult to reduce the magnetic path (yoke) length. That is, if the coil pitch is reduced, a head with a reduced yoke length is achieved and a write head having an excellent high frequency characteristic is achieved, in particular. However, if the coil pitch is reduced to the limit, the distance between the zero throat height level (the level of the air-bearing-surface-side end of the insulating layer that defines the throat height) and the outermost end of the coil is a major factor that prevents a reduction in yoke length. Since the yoke length of a two-layer coil can be shorter than that of a single-layer coil, a two-layer coil is adopted to many of write heads for high frequency application. However, in the prior-art magnetic head, a photoresist film having a thickness of about 2 µm is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion, because it is impossible to etch the seed layer of the coil in the sloped portion of the apex and the coil is therefore shorted.

Therefore, if the total coil thickness is 2 to 3 µm, the thickness of the insulating film between the layers of the coil is 2 µm, and the apex angle is 45 to 55 degrees, for example, the yoke length is required to be 6 to 8 µm which is twice as long as the distance between the outermost end of the coil and the neighborhood of the zero throat height level, that is, 3 to 4 µm (the distance between the innermost end of the coil and the portion where the top and bottom pole layers are in contact with each other is required to be 3 to 4 µm, too), in addition to the length of the portion corresponding to the coil. This length of the portion other than the portion corresponding to the coil is one of the factors that prevent a reduction in yoke length.

Assuming that a two-layer eleven-turn coil wherein the line width is 1.2 μm and the space is 0.8 μm is fabricated, for example, the portion of the yoke length corresponding to the first layer 212 of the coil is 11.2 μm, if the first layer is made up of six turns and the second layer is made up of 5 turns, as shown in FIG. 37A and FIG. 37B. In addition to this length, the total of 6 to 8 μm, that is, the distance between each of the outermost and innermost ends of the first layer 212 of the coil and each of ends of the photoresist layer 213 that insulates the first layer 212, is required for the yoke length. Therefore, the yoke length is 17.2 to 19.2 μm. If an 11-turn coil is made up of one layer, the yoke length is 27.2 to 29.2 μm. In the present patent application, the yoke length is the length of a portion of the pole layer except the pole portion and the contact portions, as indicated with $L_0$ in FIG. 37A. As thus described, it is difficult in the prior art to further reduce the yoke length, which prevents improvements in high frequency characteristic.

OBJECTS AND SUMMARY OF THE INVENTION

It is a first object of the invention to provide a thin-film magnetic head and a method of manufacturing the same for forming the pole portions of the induction-type electromagnetic transducer with accuracy and for preventing writing of data in a region in which data is not supposed to be written.

It is a second object of the invention to provide a thin-film magnetic head and a method of manufacturing the same for achieving a reduction in yoke length, in addition to the first object.

A thin-film magnetic head of the invention comprises: a medium facing surface that faces toward a recording medium; a read head incorporating: a magnetoresistive element; and a first shield layer and a second shield layer for shielding the magnetoresistive element, the first and second shield layers having portions that are located on a side of the medium facing surface and opposed to each other, the magnetoresistive element being located between these portions; and a write head incorporating: a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers and insulated from the first and second magnetic layers. The first magnetic layer is located closer to the read head than the second magnetic layer. The first magnetic layer includes: a first pole portion layer that includes the pole portion of the first magnetic layer and has surfaces one of which is adjacent to the gap layer; and a first yoke portion layer that is a yoke portion of the first magnetic layer and connected to the other surface of the first pole portion layer. An end of the first yoke portion layer that faces toward the medium facing surface is located at a distance from the medium facing surface.

A method of the invention is provided for manufacturing a thin-film magnetic head comprising: a medium facing surface that faces toward a recording medium; a read head; and a write head. In the thin-film magnetic head the read head incorporates: a magnetoresistive element; and a first shield layer and a second shield layer for shielding the magnetoresistive element, the first and second shield layers having portions that are located on a side of the medium facing surface and opposed to each other, the magnetoresistive element being located between these portions. The write head incorporates: a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers and insulated from the first and second magnetic layers. The first magnetic layer is located closer to the read head than the second magnetic layer.

The method of manufacturing the thin-film magnetic head of the invention comprises the steps of: forming the read head; forming the first magnetic layer; forming the gap layer on the first magnetic layer; forming the second magnetic layer on the gap layer; and forming the coil such that the at least part of the coil is placed between the first and second magnetic layers and insulated from the first and second magnetic layers. The step of forming the first magnetic layer includes formation of: a first pole portion layer that includes the pole portion of the first magnetic layer and has surfaces one of which is adjacent to the gap layer; and a first yoke portion layer that is a yoke portion of the first magnetic layer and connected to the other surface of the first pole portion layer. An end of the first yoke portion layer that faces toward the medium facing surface is located at a distance from the medium facing surface.

According to the thin-film magnetic head or the method of manufacturing the same of the invention, the first magnetic layer includes the first pole portion layer and the first yoke portion layer. In addition, the end of the first yoke portion layer that faces toward the medium facing surface is located at a distance from the medium facing surface. As a result, it is possible to form the first pole portion layer of the first magnetic layer with accuracy, and it is thereby possible to form the pole portion with accuracy. According to the invention, the end of the first yoke portion layer that faces toward the medium facing surface is located at a distance from the medium facing surface, so that writing of data in a region where data is not supposed to be written is prevented.

According to the thin-film magnetic head or the method of manufacturing the same of the invention, the first pole portion layer may include a portion that has a width equal to a track width and that has an end located in the medium facing surface.

According to the thin-film magnetic head or the method of manufacturing the same of the invention, the first pole portion layer may include: a first portion that has a width equal to a track width and has an end located in the medium facing surface; and a second portion that has a width greater than the track width and is located farther from the medium facing surface than the first portion.

According to the thin-film magnetic head or the method of manufacturing the same of the invention, an insulating layer encasing portion and a throat height defining insulating layer may be provided. In the encasing portion the throat height defining insulating layer that defines a throat height is placed, the encasing portion being formed in the first pole portion layer.

According to the thin-film magnetic head or the method of manufacturing the same of the invention, the at least part of the thin-film coil may be located on a side of the first pole portion layer. In this case, it is possible to provide a coil insulating layer that covers the at least part of the coil located on the side of the first pole portion layer and has a surface facing toward the gap layer, the surface being flattened together with the surface of the first pole portion layer adjacent to the gap layer.

According to the thin-film magnetic head or the method of manufacturing the same of the invention, the second magnetic layer may include: a second pole portion layer that includes the pole portion of the second magnetic layer and has surfaces one of which is adjacent to the gap layer; and a second yoke portion layer that is a yoke portion of the second magnetic layer and connected to the other surface of the second pole portion layer. In addition, an end of the second yoke portion layer that faces toward the medium facing surface may be located at a distance from the medium facing surface.

In this case, each of the first and second magnetic layers includes the pole portion layer and the yoke portion layer, and the end of each of the yoke portion layers that faces toward the medium facing surface is located at a distance from the medium facing surface. It is therefore possible to form the two pole portion layers with accuracy, and it is thereby possible to form the pole portions with accuracy. In this case, the end of each of the yoke portion layers that faces toward the medium facing surface is located at a distance from the medium facing surface, so that writing of data in a region where data is not supposed to be written is prevented.

According to the thin-film magnetic head or the method of manufacturing the same of the invention, each of the first and second pole portion layers may include a portion that has a width equal to a track width and has an end located in the medium facing surface.

According to the thin-film magnetic head or the method of manufacturing the same of the invention, at least one of the first and second pole portion layers may include: a first portion that has a width equal to a track width and has an end located in the medium facing surface; and a second portion that has a width greater than the track width and is located farther from the medium facing surface than the first portion.

According to the thin-film magnetic head or the method of manufacturing the same of the invention, it is possible to provide: an insulating layer encasing portion in which a throat height defining insulating layer that defines the throat height is placed, the encasing portion being formed in one of the first and second pole portion layers; and the throat height defining insulating layer that is placed in the insulating layer encasing portion.

According to the thin-film magnetic head or the method of manufacturing the same of the invention, the at least part of the thin-film coil may be located on a side of the second pole portion layer. In this case, it is possible to provide a coil insulating layer that covers the at least part of the coil located on the side of the second pole portion layer and has a surface facing toward the second yoke portion layer, the surface being flattened together with the surface of the second pole portion layer that faces toward the second yoke portion layer.

According to the thin-film magnetic head or the method of manufacturing the same of the invention, the at least part of the thin-film coil may be located on a side of the first pole portion layer, and the second magnetic layer is made up of one layer including a portion that defines a track width.

In this case, the at least part of the coil is located on a side of the first pole portion layer, so that it is possible that the second magnetic layer made up of the one layer is made flat or nearly flat, and the pole portion is formed with accuracy.

Other and further objects, features and advantages of the invention will appear more fully from the following description.

BRIEF DESCRIPTION OF THE DRAWINGS

FIG. 26A and FIG. 26B are cross sections for illustrating a step of a method of manufacturing a thin-film magnetic head of a fifth embodiment of the invention.

FIG. 27A and FIG. 27B are cross sections for illustrating a step that follows FIG. 26A and FIG. 26B.

FIG. 30A and FIG. 30B are cross sections for illustrating a step that follows FIG. 29A and FIG. 29B.

FIG. 31A and FIG. 31B are cross sections of the thin-film magnetic head of the fifth embodiment.

FIG. 32 is a perspective view that illustrates a neighborhood of the pole portions of the bottom and top pole layers of the thin-film magnetic head of the fifth embodiment.

FIG. 33A and FIG. 33B are cross sections of a thin-film magnetic head of a sixth embodiment of the invention.

FIG. 34A and FIG. 34B are cross sections for illustrating a step of a method of manufacturing a thin-film magnetic head of related art.

FIG. 35A and FIG. 35B are cross sections for illustrating a step that follows FIG. 34A and FIG. 34B.

FIG. 36A and FIG. 36B are cross sections for illustrating a step that follows FIG. 35A and FIG. 35B.

FIG. 37A and FIG. 37B are cross sections for illustrating a step that follows FIG. 36A and FIG. 36B.

DETAILED DESCRIPTION OF THE PREFERRED EMBODIMENTS

Preferred embodiments of the invention will now be described in detail with reference to the accompanying drawings.

First Embodiment

Reference is now made to FIG. 1A to FIG. 8A, FIG. 1B to FIG. 8B, and FIG. 9 to describe a thin-film magnetic head and a method of manufacturing the same of a first embodiment of the invention. FIG. 1A to FIG. 8A are cross sections each orthogonal to an air bearing surface. FIG. 1B to FIG. 8B are cross sections of the pole portion each parallel to the air bearing surface.

Figures 1A, 1B:
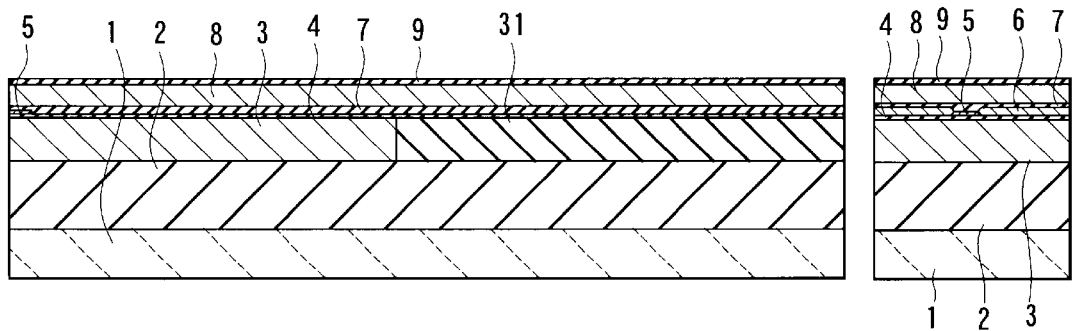
FIG. 1A and FIG. 1B are cross sections for illustrating a step of a method of manufacturing a thin-film magnetic head of a first embodiment of the invention.

In the manufacturing method, as shown in FIG. 1A and FIG. 1B, an insulating layer 2 made of alumina ($Al_2O_3$), for example, whose thickness is about 5 μm, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 μm is formed for making a read head. The bottom shield layer 3 is formed through plating selectively on the insulating layer 2, using a photoresist film as a mask, for example. Next, an insulating layer 31 of alumina, for example, having a thickness of 4 to 5 μm, for example, is formed over the entire surface. The insulating layer 31 is polished through chemical mechanical polishing (CMP), for example, so that the bottom shield layer 3 is exposed, and the surface is flattened.

Next, on the bottom shield layer 3, a bottom shield gap film 4 having a thickness of about 20 to 40 nm, for example, is formed as an insulating film. On the bottom shield gap film 4, an MR element 5 for reading having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulating material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina films are fabricated through CVD, trimethyl aluminum ($Al(CH_3)_3$) and $H_2O$ are used, for example. Through the use of CVD, it is possible to make the thin and closely packed shield gap films 4 and 7 with few pinholes.

Next, on the top shield gap film 7, a top shield layer 8 having a thickness of 1.0 μm, for example, is formed. The top shield layer 8 is made of a magnetic material such as Permalloy and used for the read head.

Next, on the top shield layer 8, an insulating film 9 of alumina, for example, having a thickness of 0.1 to 0.2 μm, for example, is formed for magnetically insulating the read head and the write head from each other.

Figures 2A, 2B:
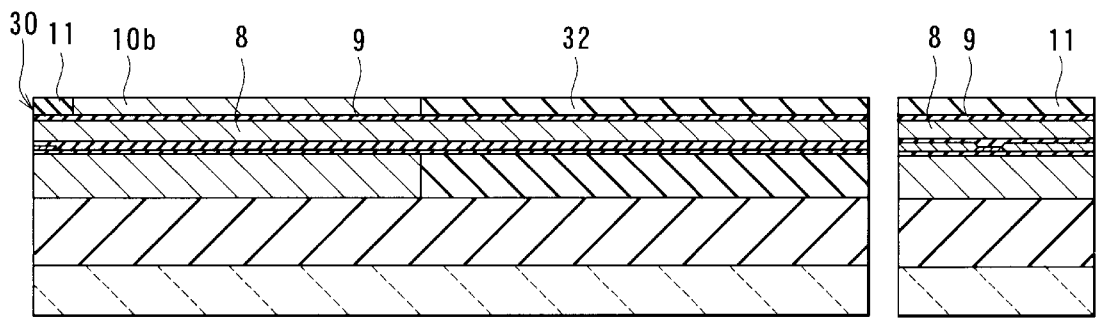
FIG. 2A and FIG. 2B are cross sections for illustrating a step that follows FIG. 1A and FIG. 1B.

Next, as shown in FIG. 2A and FIG. 2B, on the insulating film 9, a yoke portion layer 10b made of a magnetic material and having a thickness of 1.5 μm, for example, is selectively formed to be a yoke portion of the bottom pole layer 10 of the write head. The bottom pole layer 10 is made up of the yoke portion layer 10b, and a pole portion layer 10a and a connecting portion layer 10c that will be described later. An end of the yoke portion layer 10b that faces toward the air bearing surface 30 is located at a distance from the air bearing surface 30.

The yoke portion layer 10b may be made of NiFe (80 weight % Ni and 20 weight % Fe), or NiFe (45 weight % Ni and 55 weight % Fe) that is a high saturation flux density material and formed through plating, or may be made of a material such as FeN or FeZrN that is a high saturation flux density material through sputtering. Alternatively, a material such as CoFe or a Co-base amorphous material that is a high saturation flux density material may be used.

Next, an insulating layer of alumina, for example, having a thickness of about 2 to 3 μm is formed over the entire surface, and polished through CMP, for example, so that the yoke portion layer 10b is exposed, and the surface is flattened. As a result, an insulating layer 11 that extends from the air bearing surface 30 to the end of the yoke portion layer 10b that faces toward the air bearing surface 30 is formed on the insulating film 9, as shown in FIG. 2A and FIG. 2B. An insulating layer 32 is formed in the other portion on the insulating film 9.

Figures 3A, 3B:
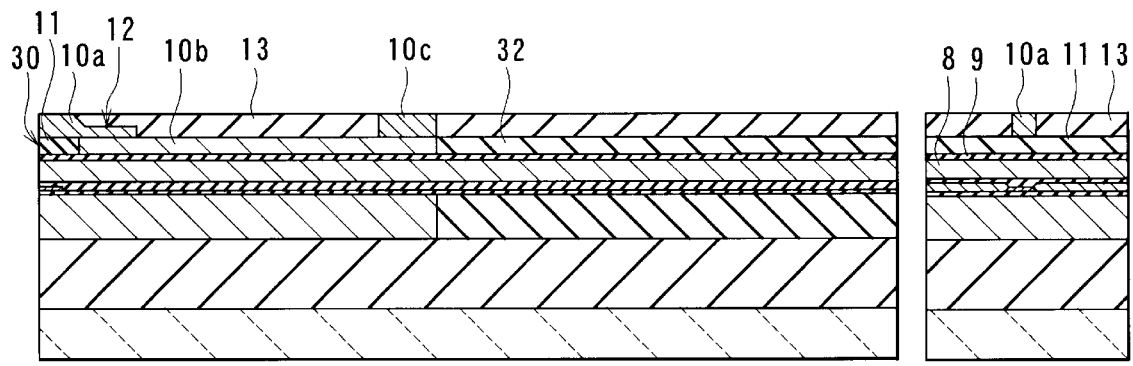
FIG. 3A and FIG. 3B are cross sections for illustrating a step that follows FIG. 2A and FIG. 2B.

Next, as shown in FIG. 3A and FIG. 3B, the pole portion layer 10a of the bottom pole layer 10 is formed on the insulating layer 11 and the yoke portion layer 10b, and the connecting portion layer 10c is formed on the yoke portion layer 10b. The pole portion layer 10a includes the pole portion of the bottom pole layer 10. The connecting portion layer 10c is located near the center of a thin-film coil described later. Each of the pole portion layer 10a and the connecting portion layer 10c has a thickness of 1.0 μm, for example.

The pole portion layer 10a and the connecting portion layer 10c of the bottom pole layer 10 may be made of NiFe (80 weight % Ni and 20 weight % Fe), or NiFe (45 weight % Ni and 55 weight % Fe) that is a high saturation flux density material and formed through plating, or may be made of a material such as FeN or FeZrN that is a high saturation flux density material through sputtering. Alternatively, a material such as CoFe or a Co-base amorphous material that is a high saturation flux density material may be used.

Next, a portion of the top surface of the pole portion layer 10a that extends from a desired zero throat height level to a side farther from the air bearing surface 30 is etched through ion milling, for example, only by 0.3 to 0.6 µm, for example. As a result, an insulating layer encasing portion 12 is formed in the portion of the pole portion layer 10a that extends from the zero throat height level to the side farther from the air bearing surface 30. In the insulating layer encasing portion 12 a throat height defining insulating layer described later that defines the throat height is placed.

Next, an insulating layer 13 of alumina, for example, having a thickness of about 2 to 3 µm is formed over the entire surface, and polished through CMP, for example, so that the pole portion layer 10a and the connecting portion layer 10c are exposed, and the surface is flattened. As shown in FIG. 3A and FIG. 3B, a portion of the insulating layer 13 placed in the insulating layer encasing portion 12 is the throat height defining insulating layer.

Figures 4A, 4B:
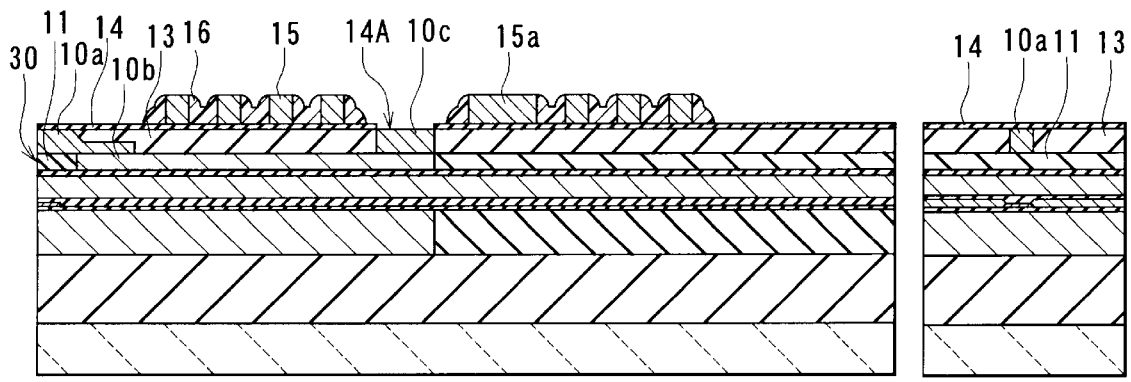
FIG. 4A and FIG. 4B are cross sections for illustrating a step that follows FIG. 3A and FIG. 3B.

Next, as shown in FIG. 4A and FIG. 4B, a write gap layer 14 made of an insulating material whose thickness is about 0.1 to 0.15 µm, for example, is formed on the entire surface. In general, the insulating material used for the write gap layer 14 may be alumina, aluminum nitride, a silicon-dioxide-base material, a silicon-nitride-base material, or diamond-like carbon (DLC) and so on. The write gap layer 14 may be fabricated through sputtering or CVD. If the write gap layer 14 made of an alumina film is fabricated through CVD, trimethyl aluminum (Al(CH$_3$)$_3$) and H$_2$O are used, for example. Through the use of CVD, it is possible to make the thin and closely packed gap layer 14 with few pinholes.

Next, a portion of the write gap layer 14 located near the center of the thin-film coil described later is etched to form a contact hole 14A for making the magnetic path.

Next, a first layer 15 of the thin-film coil made of copper, for example, is formed by frame plating on the write gap layer 14. For example, the thickness of the first layer 15 is 1.0 to 2.0 µm and the pitch is 1.2 to 2.0 µm. The first layer 15 of the coil is wound around the connecting portion layer 10c. In the drawings numeral 15a indicates a portion for connecting the first layer 15 to a second layer 20 of the coil described later. Next, a photoresist layer 16 is formed to surround the first layer 15.

Figures 5A, 5B:
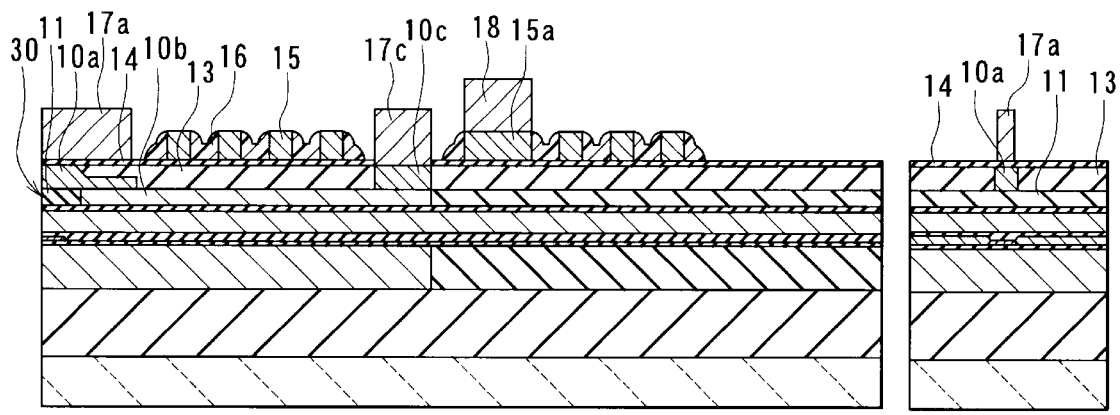
FIG. 5A and FIG. 5B are cross sections for illustrating a step that follows FIG. 4A and FIG. 4B.

Next, as shown in FIG. 5A and FIG. 5B, a pole portion layer 17a that includes the pole portion of the top pole layer 17 is formed on a portion of the write gap layer 14 near an end thereof closer to the air bearing surface 30. At the same time, a connecting portion layer 17c is formed in the contact hole 14A, and a connecting layer 18 is formed on the connecting portion 15a of the first layer 15 of the thin-film coil. The pole portion layer 17a, the connecting portion layer 17c and the connecting layer 18 are made of the same magnetic material and each of them has a thickness of 3 µm, for example. The connecting portion layer 17c is connected to the connecting portion layer 10c of the bottom pole layer 10. The top pole layer 17 is made up of the pole portion layer 17a and the connecting portion layer 17c, and a yoke portion layer 17b described later.

The pole portion layer 17a, the connecting portion layer 17c and the connecting layer 18 may be made of NiFe (80 weight % Ni and 20 weight % Fe), or NiFe (45 weight % Ni and 55 weight % Fe) that is a high saturation flux density material and formed into specific shapes through plating, or may be made of a material such as FeN or FeZrN that is a high saturation flux density material and formed through sputtering and selectively etched through ion milling, for example, into the specific shapes. Alternatively, a material such as CoFe or a Co-base amorphous material that is a high saturation flux density material may be used.

Figures 6A, 6B:
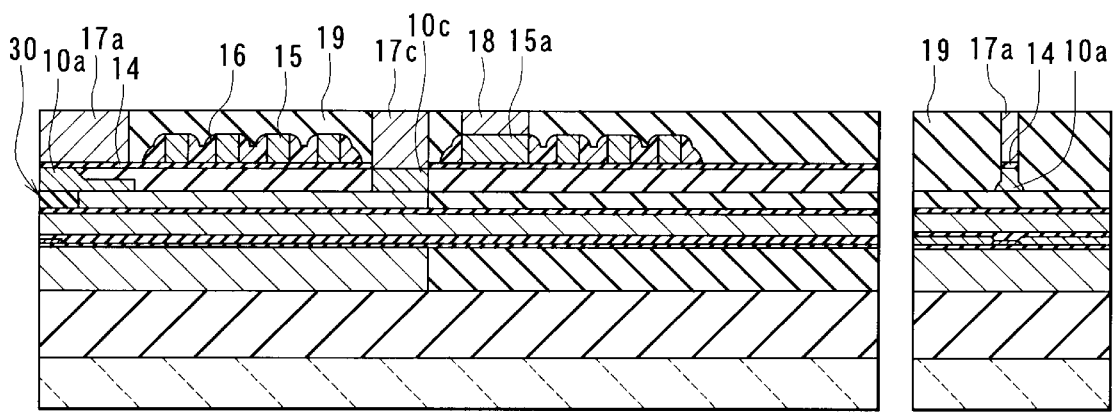
FIG. 6A and FIG. 6B are cross sections for illustrating a step that follows FIG. 5A and FIG. 5B.

Next, as shown in FIG. 6A and FIG. 6B, the write gap layer 14 around the pole portion layer 17a is selectively etched through dry etching, using the pole portion layer 17a as a mask. This dry etching may be reactive ion etching (RIE) using a chlorine-base gas such as BCl$_2$ or Cl$_2$, or a fluorine-base gas such as CF$_4$ or SF$_6$, for example. Next, the pole portion layer 10a of the bottom pole layer 10 around the pole portion layer 17a is selectively etched by about 0.3 to 0.6 µm, using the pole portion layer 17a as a mask, through ion milling using an argon-base gas, for example. A trim structure as shown in FIG. 6B is thus formed. The trim structure suppresses an increase in the effective track width due to expansion of a magnetic flux generated during writing in a narrow track. The width of the pole portion layer 17a and the width of the pole portion layer 10a measured at the air bearing surface 30 may be made equal throughout the thickness. In this case, the write gap layer 14 and the pole portion layer 10a around the pole portion layer 17a may be etched, using the pole portion layer 17a as a mask. Alternatively, the pole portion layer 17a, the write gap layer 14 and the pole portion layer 10a may be etched, using a mask layer formed on the pole portion layer 17a as a mask.

Next, a coil insulating layer 19 of alumina, for example, having a thickness of about 3 to 4 µm is formed over the entire surface. The coil insulating film 19 is then polished through CMP, for example, so that the pole portion layer 17a, the connecting portion layer 17c and the connecting layer 18 are exposed, and the surface is flattened.

Figures 7A, 7B:
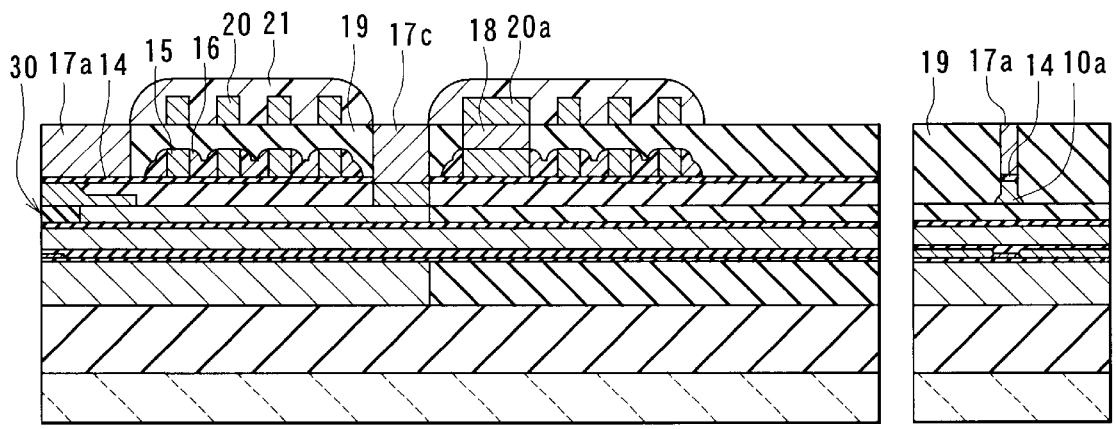
FIG. 7A and FIG. 7B are cross sections for illustrating a step that follows FIG. 6A and FIG. 6B.

Next, as shown in FIG. 7A and FIG. 7B, the second layer 20 of the thin-film coil made of copper, for example, is formed by frame plating on the coil insulating layer 19. For example, the thickness of the second layer 20 is 1.0 to 2.0 µm and the pitch is 1.2 to 2.0 µm. The second layer 20 of the coil is wound around the connecting portion layer 17c. In the drawings numeral 20a indicates a portion for connecting the second layer 20 to the first layer 15 of the coil. The connecting portion 20a is connected to the connecting portion 15a of the first layer 15 through the connecting layer 18. Next, a photoresist layer 21 is formed to surround the second layer 20.

Figures 8A, 8B:
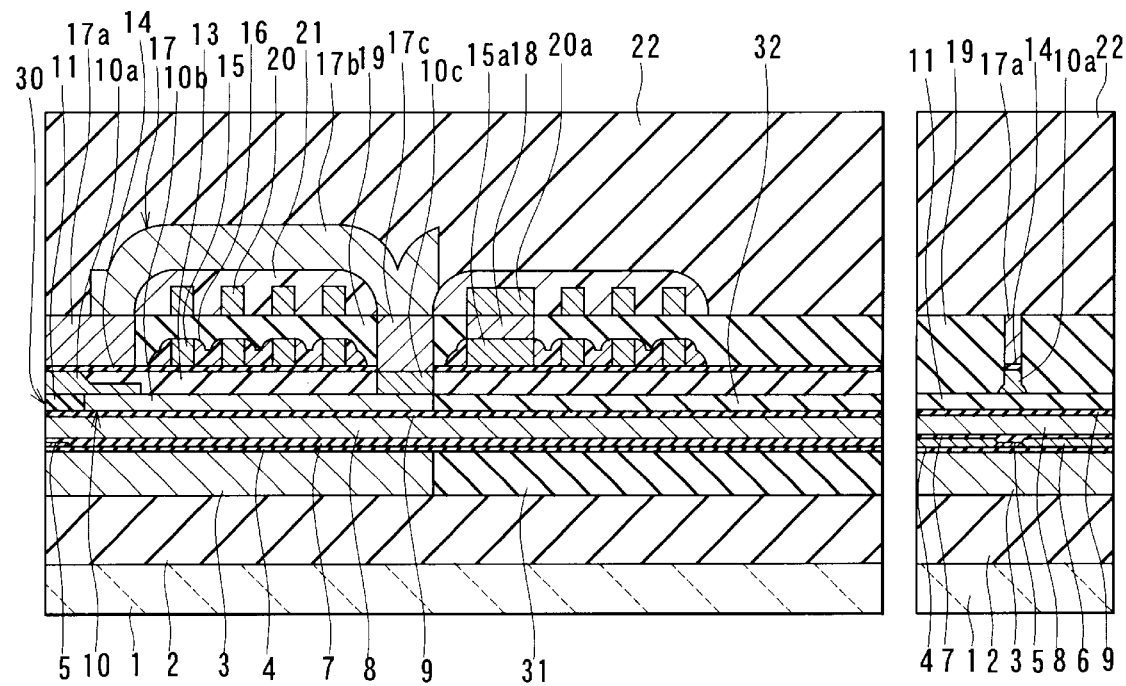
FIG. 8A and FIG. 8B are cross sections of the thin-film magnetic head of the first embodiment.

Next, as shown in FIG. 8A and FIG. 8B, the yoke portion layer 17b having a thickness of 2.0 to 3.0 µm, for example, is formed to be the yoke portion of the top pole layer 17 on the pole portion layer 17a, the photoresist layer 21 and the connecting portion layer 17c. The yoke portion layer 17b may be made of NiFe (80 weight % Ni and 20 weight % Fe), or NiFe (45 weight % Ni and 55 weight % Fe) that is a high saturation flux density material and formed into a specific shape through plating, or may be made of a material such as FeN or FeZrN that is a high saturation flux density material through sputtering and then selectively etched through ion milling, for example, into the specific shape. Alternatively, a material such as CoFe or a Co-base amorphous material as a high saturation flux density material may be used. To improve the high frequency characteristic, the yoke portion layer 17b may be made of a number of layers of inorganic insulating films and magnetic layers of Permalloy, for example.

An end of the yoke portion layer 17 that faces toward the air bearing surface 30 is located at a distance from the air bearing surface 30.

Next, an overcoat layer 22 of alumina, for example, having a thickness of 20 to 40 μm, for example, is formed over the entire surface. The surface of the overcoat layer 22 is flattened and pads (not shown) for electrodes are formed on the overcoat layer 22. Finally, lapping of the slider including the foregoing layers is performed to form the air bearing surfaces 30 of the thin-film magnetic head including the write head and the read head. The thin-film magnetic head of the embodiment is thus completed.

Figure 9:
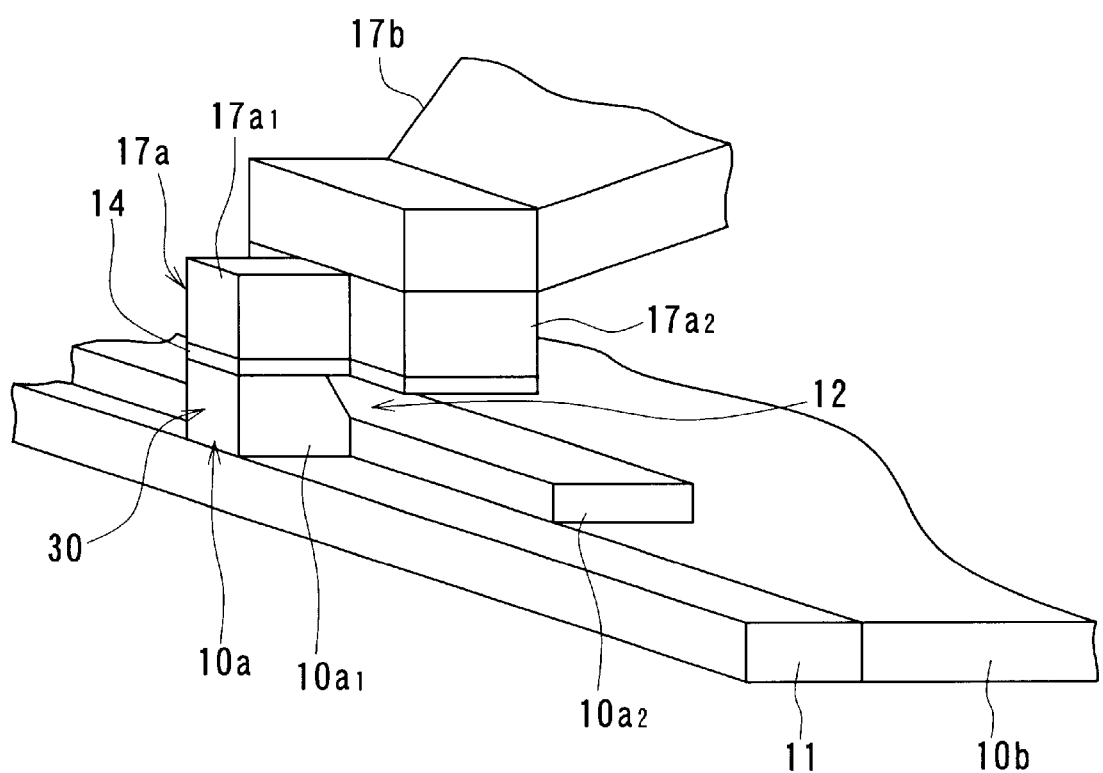
FIG. 9 is a perspective view that illustrates a neighborhood of the pole portions of the bottom and top pole layers of the thin-film magnetic head of the first embodiment.

FIG. 9 is a perspective view that illustrates a neighborhood of the pole portions of the bottom pole layer 10 and the top pole layer 17 of the thin-film magnetic head of the embodiment.

In this embodiment the bottom pole layer 10 corresponds to the first magnetic layer of the invention. The top pole layer 17 corresponds to the second magnetic layer of the invention. The bottom shield layer 3 corresponds to the first shield layer of the invention. The top shield layer 8 corresponds to the second shield layer of the invention.

As described so far, the thin-film magnetic head of the embodiment comprises: the medium facing surface (the air bearing surface 30) that faces toward a recording medium; the read head; and the write head (the induction-type electromagnetic transducer). The read head and the write head are magnetically insulated from each other by the insulating film 9.

The read head incorporates: the MR element 5; and the bottom shield layer 3 and the top shield layer 8 for shielding the MR element 5. Portions of the bottom shield layer 3 and the top shield layer 8 that are located on a side of the air bearing surface 30 are opposed to each other, the MR element 5 being placed between these portions.

The write head incorporates the bottom pole layer 10 and the top pole layer 17 magnetically coupled to each other, each of which includes at least one layer. The bottom pole layer 10 and the top pole layer 17 include the pole portions that are opposed to each other and placed in regions on a side of the air bearing surface 30. The write head further incorporates: the write gap layer 14 placed between the pole portions of the two pole layers 10 and 17; and the thin-film coil (15 and 20) at least a part of which is placed between the two pole layers 10 and 17 and insulated from the two pole layers 10 and 17.

The bottom pole layer 10 includes the pole portion layer 10a and the yoke portion layer 10b. The pole portion layer 10a includes the pole portion of the bottom pole layer 10 and has surfaces one of which (the top surface) is adjacent to the write gap layer 14. The yoke portion layer 10b is the yoke portion of the bottom pole layer 10 and is connected to the other surface (the bottom surface) of the pole portion layer 10a. The yoke portion layer 10b has an end facing toward the air bearing surface 30 that is located at a distance from the air bearing surface 30. The insulating layer 11 is located between the air bearing surface 30 and the end of the yoke portion layer 10b that faces toward the air bearing surface 30.

The top pole layer 17 includes the pole portion layer 17a and the yoke portion layer 17b. The pole portion layer 17a includes the pole portion of the top pole layer 17 and has surfaces one of which (the bottom surface) is adjacent to the write gap layer 14. The yoke portion layer 17b is the yoke portion of the top pole layer 17 and is connected to the other surface (the top surface) of the pole portion layer 17a. The yoke portion layer 17b has an end facing toward the air bearing surface 30 that is located at a distance from the air bearing surface 30.

As shown in FIG. 9, the pole portion layer 10a of the bottom pole layer 10 includes a first portion $10a_1$ and a second portion $10a_2$. The first portion $10a_1$ has ends one of which is located in the air bearing surface 30. At least a part of the first portion $10a_1$ has a width equal to the write track width. The second portion $10a_2$ has a width greater than the write track width and is coupled to a part of the first portion $10a_1$ farther from the air bearing surface 30. The insulating layer encasing portion 12 is formed in the surface of the pole portion layer 10a that faces toward the write gap layer 14, in the portion that extends from the zero throat height level to a portion farther from the air bearing surface 30. In the encasing portion 12 the throat height defining insulating layer which is a part of the insulating layer 13 (not shown in FIG. 9) is placed. In this embodiment the throat height is defined by an end of the encasing portion 12 closer to the air bearing surface 30.

The pole portion layer 17a of the top pole layer 17 includes a first portion $17a_1$ and a second portion $17a_2$. The first portion $17a_1$ has ends one of which is located in the air bearing surface 30, and has a width equal to the write track width. The second portion $17a_2$ has a width greater than the write track width and is coupled to a part of the first portion $17a_1$ farther from the air bearing surface 30.

The first layer 15 of the thin-film coil is located on a side of the pole portion layer 17a of the top pole layer 17. The first layer 15 is covered with the photoresist layer 16 and the coil insulating layer 19. The top surface of the coil insulating layer 19 is flattened, together with the top surface of the pole portion layer 17a. The second layer 20 of the coil is formed on the coil insulating layer 19.

According to the embodiment as thus described, the bottom pole layer 10 includes the pole portion layer 10a and the yoke portion layer 10b, and the top pole layer 17 includes the pole portion layer 17a and the yoke portion layer 17b. As a result, it is possible to form the pole portion layers 10a and 17a including the pole portions that have minute dimensions with accuracy. According to the embodiment, the end of each of the yoke portion layers 10b and 17b that faces toward the air bearing surface 30 is located at a distance from the air bearing surface 30. Therefore, when the width of the pole portion of the top pole layer 17 and the width of the pole portion of the bottom pole layer 10 that are measured at the air bearing surface 30 are made equal, it is only required that the widths of the pole portions of the two pole portion layers 10a and 17a are made equal, while it is not necessary that the widths of the pole portions of four layers including the pole portion layers 10a and 17a and the yoke portion layers 10b and 17b are made equal. Therefore, according to the embodiment, it is easy to make the widths of the pole portions of the top pole layer 17 and the bottom pole layer 10 equal with accuracy. It is thereby possible to form the pole portions of the write head (the induction-type electromagnetic transducer) with accuracy.

In this embodiment the end of each of the yoke portion layers 10b and 17b facing toward the air bearing surface 30 is located at a distance from the air bearing surface 30. As a result, the embodiment prevents 'side write', that is, writing of data in a region of a recording medium where data is not supposed to be written.

According to the prior-art composite thin-film magnetic head in which the bottom pole layer of the write head also functions as the top shield layer of the read head, noise is created in a read signal of the read head or variations in read signal increase, immediately after writing is performed by the write head. One of the reasons is considered to be residual magnetism produced in the write head as the write head performs writing, and variations in such residual magnetism.

According to the embodiment, in contrast, the top shield layer 8 of the read head and the bottom pole layer 10 of the write head are isolated from each other, and the insulating film 9 is located in between. As a result, the effect of residual magnetism created in the write head on the MR element 5 is reduced. Furthermore, according to the embodiment, the end of the yoke portion layer 10b of the bottom pole layer 10 facing toward the air bearing surface 30 is located at a distance from the air bearing surface 30. In addition, the insulating layer 11 is located between the air bearing surface 30 and the end of the yoke portion layer 10b that faces toward the air bearing surface 30. As a result, the pole portions of the write head and the MR element 5 of the read head are magnetically isolated from each other by the insulating layer 11. It is thereby possible to further reduce the effect of residual magnetism created in the write head on the MR element 5. The embodiment thus reduces the noise and variations in read signal resulting from writing of the write head.

According to the embodiment, the throat height is defined by an end of the insulating layer encasing portion 12 closer to the air bearing surface 30. If the throat height is defined by an end of the pole portion layer 10a of the bottom pole layer 10 when the entire length of the pole portion layer 10a is equal to the throat height, the cross-sectional area of the magnetic path abruptly decreases in the portion connecting the pole portion layer 10a to the yoke portion layer 10b. As a result, a magnetic flux may be saturated in this portion. This problem more frequently occurs when the throat height is small.

According to the embodiment, in contrast, the insulating layer encasing portion 12 is formed in the pole portion layer 10a of the bottom pole layer 10, and the throat height is defined by the end of the encasing portion 12 closer to the air bearing surface 30. As a result, the pole portion layer 10a and the yoke portion layer 10b are in contact with each other in a region farther from the air bearing surface 30 than the zero throat height level, too. Therefore, according to the embodiment, it is impossible that the cross-sectional area of the magnetic path abruptly decreases in the bottom pole layer 10. As a result, saturation of a magnetic flux halfway through the magnetic path is prevented. According to the embodiment, it is thereby possible to utilize the magnetomotive force generated by the layers 15 and 20 of the thin-film coil for writing with efficiency.

According to the embodiment, the first layer 15 of the thin-film coil is located on a side of the pole portion layer 17a of the top pole layer 17, and is formed on the flat write gap layer 14. It is thereby possible to form the first layer 15 having minute dimensions with accuracy. Furthermore, according to the embodiment, the top surface of the coil insulating layer 19 that covers the first layer 15 is flattened, together with the top surface of the pole portion layer 17a. The second layer 20 of the coil is formed on the coil insulating layer 19 flattened. It is thereby possible to form the second layer 20 having minute dimensions with accuracy, too. According to the embodiment, an end of the first layer 15 of the coil is located near the end of the pole portion layer 17a farther from the air bearing surface 30.

As thus described, according to the embodiment, the yoke length is made shorter than that of the prior-art head.

Furthermore, it is possible to prevent the magnetomotive force generated by the layers 15 and 20 of the thin-film coil from saturating halfway, and to utilize this magnetomotive force for writing with efficiency. It is thus possible to provide the thin-film magnetic head having the write head with an excellent high frequency characteristic, an excellent nonlinear transition shift (NLTS) characteristic and an excellent overwrite property that is a parameter indicating one of characteristics when data is written over existing data.

Second Embodiment

Reference is now made to FIG. 10A to FIG. 14A and FIG. 10B to FIG. 14B to describe a thin-film magnetic head and a method of manufacturing the same of a second embodiment of the invention. FIG. 10A to FIG. 14A are cross sections orthogonal to the air bearing surface. FIG. 10B to FIG. 14B are cross sections of pole portions parallel to the air bearing surface.

The thin-film magnetic head of the second embodiment is an example in which the thin-film coil is made up of a single layer, and the throat height is defined on a side of the top pole layer. The steps of the method of manufacturing the thin-film magnetic head of the second embodiment that are taken until the top shield gap film 7 is formed are similar to those of the first embodiment.

Figures 10A, 10B:
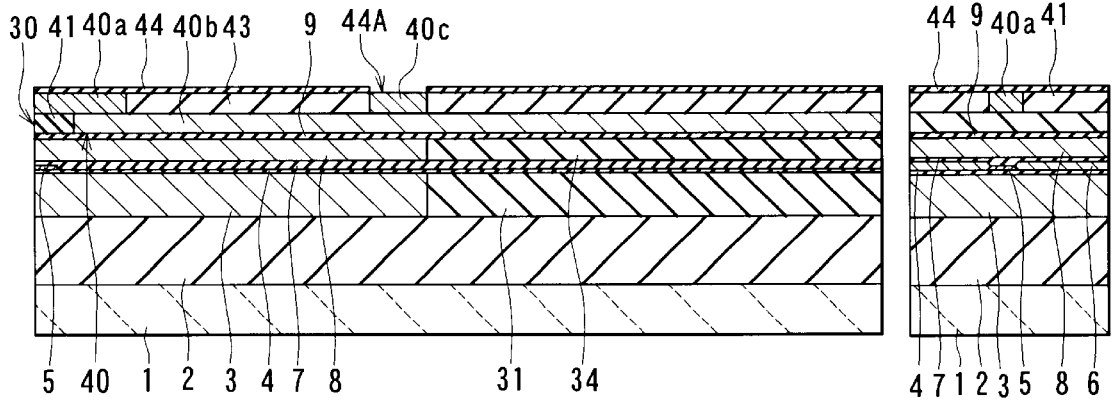
FIG. 10A and FIG. 10B are cross sections for illustrating a step of a method of manufacturing a thin-film magnetic head of a second embodiment of the invention.

In the following step of the method of the second embodiment, as shown in FIG. 10A and FIG. 10B, on the top shield gap film 7, the top shield layer 8 having a thickness of 1.0 $\mu$m, for example, is formed for the read head. The top shield layer 8 is made of a magnetic material such as Permalloy. Next, an insulating layer 34 of alumina, for example, having a thickness of about 2 to 3 $\mu$m, is formed on the entire surface, and polished through CMP, for example, so that the top shield layer 8 is exposed, and the surface is flattened.

Next, on the top shield layer 8 and the insulating layer 34, the insulating film 9 of alumina, for example, having a thickness of 0.1 to 0.2 $\mu$m, for example, is formed for magnetically insulating the read head and the write head from each other.

Next, a yoke portion layer 40b made of a magnetic material and having a thickness of 1.5 $\mu$m, for example, is selectively formed on the insulating film 9 to be a yoke portion of a bottom pole layer 40 of the write head. The bottom pole layer 40 is made up of the yoke portion layer 40b, and a pole portion layer 40a and a connecting portion layer 40c that will be described later. An end of the yoke portion layer 40b that faces toward the air bearing surface 30 is located at a distance from the air bearing surface 30. The material and the method of forming the yoke portion layer 40b are similar to those of the yoke portion layer 10b of the first embodiment.

Next, an insulating layer of alumina, for example, having a thickness of about 2 to 3 $\mu$m is formed over the entire surface, and polished through CMP, for example, so that the yoke portion layer 40b is exposed, and the surface is flattened. As a result, an insulating layer 41 that extends from the air bearing surface 30 to the end of the yoke portion layer 40b that faces toward the air bearing surface 30 is formed on the insulating film 9, as shown in FIG. 10A and FIG. 10B.

Next, the pole portion layer 40a of the bottom pole layer 40 is formed on the insulating layer 41 and the yoke portion layer 40b, and the connecting portion layer 40c is formed on the yoke portion layer 40b. The pole portion layer 40a includes the pole portion of the bottom pole layer 40. The connecting portion layer 40c is located near the center of a thin-film coil described later. Each of the pole portion layer 40a and the connecting portion layer 40c has a thickness of 1.0 μm, for example.

The material and the method of forming the pole portion layer 40a and the connecting portion layer 40c of the bottom pole layer 40 are similar to those of the pole portion layer 10a and the connecting portion layer 10c of the bottom pole layer 10 of the first embodiment.

Next, an insulating layer 43 of alumina, for example, having a thickness of about 2 to 3 μm is formed over the entire surface, and polished through CMP, for example, so that the pole portion layer 40a and the connecting portion layer 40c are exposed, and the surface is flattened.

Next, a write gap layer 44 made of an insulating material whose thickness is about 0.1 to 0.15 μm, for example, is formed on the entire surface. The material and the method of forming the write gap layer 44 are similar to those of the write gap layer 14 of the first embodiment.

Next, a portion of the write gap layer 44 located near the center of the thin-film coil described later is etched to form a contact hole 44A for making the magnetic path.

Figures 11A, 11B:
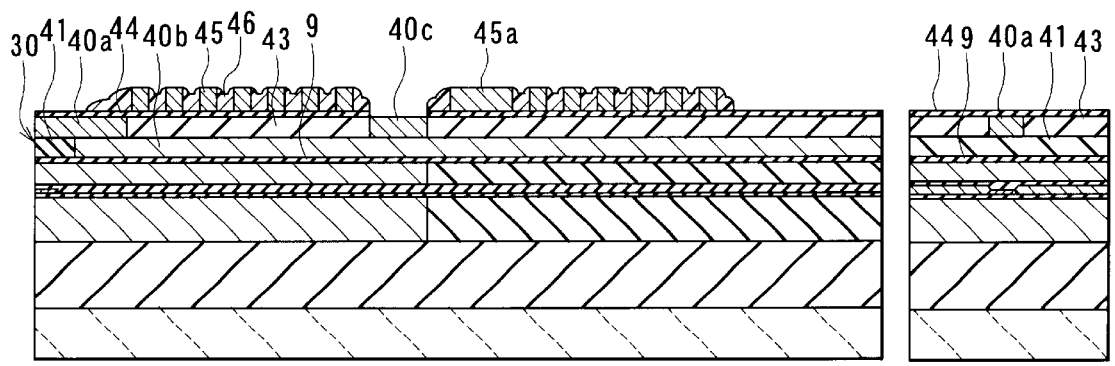
FIG. 11A and FIG. 11B are cross sections for illustrating a step that follows FIG. 10A and FIG. 10B.

Next, as shown in FIG. 11A and FIG. 11B, the thin-film coil 45 made of copper, for example, is formed by frame plating on the write gap layer 44. For example, the thickness of the coil 45 is 1.0 to 2.0 μm and the pitch is 1.2 to 2.0 μm. The coil 45 is wound around the connecting portion layer 40c. In the drawings numeral 45a indicates a portion for connecting the coil 45 to a lead layer 50 described later. Next, a photoresist layer 46 is formed to surround the coil 45.

Figures 12A, 12B:
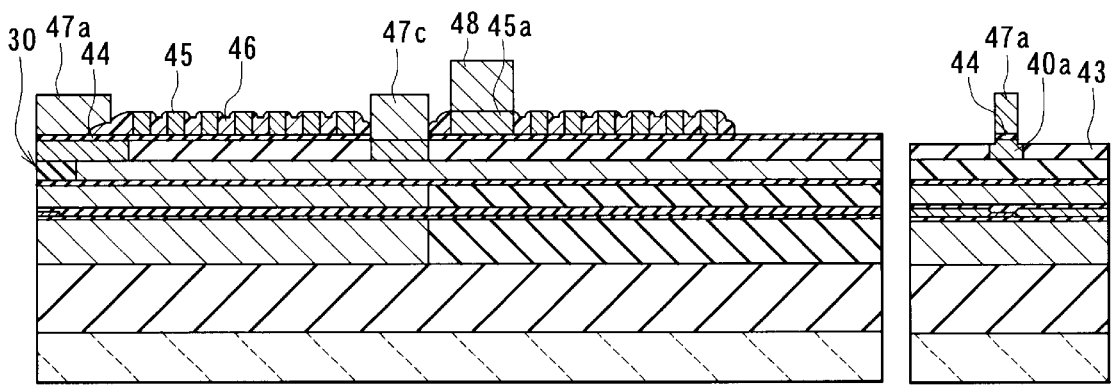
FIG. 12A and FIG. 12B are cross sections for illustrating a step that follows FIG. 11A and FIG. 11B.

Next, as shown in FIG. 12A and FIG. 12B, a pole portion layer 47a that includes the pole portion of the top pole layer 47 is formed on a portion of the write gap layer 44 near an end thereof closer to the air bearing surface 30. At the same time, a connecting portion layer 47c is formed in the contact hole 44A, and a connecting layer 48 is formed on the connecting portion 45a of the thin-film coil 45. The pole portion layer 47a, the connecting portion layer 47c and the connecting layer 48 are made of the same magnetic material and each of them has a thickness of 3 μm, for example.

The connecting portion layer 47c is connected to the connecting portion layer 40c of the bottom pole layer 40. The top pole layer 47 is made up of the pole portion layer 47a and the connecting portion layer 47c, and a yoke portion layer 47b described later.

The material and the method of forming the pole portion layer 47a, the connecting portion layer 47c and the connecting layer 48 are similar to those of the pole portion layer 17a, the connecting portion layer 17c and the connecting layer 18 of the first embodiment.

In the second embodiment a portion of the pole portion layer 47a located near an end thereof farther from the air bearing surface 30 is formed on the photoresist layer 46. The throat height is defined by an end of the photoresist layer 46 closer to the air bearing surface 30. Therefore, the throat height defining insulating layer of the second embodiment is the portion of the photoresist layer 46 located between the pole portion layer 47a and the write gap layer 44. The insulating layer encasing portion is the portion of the pole portion layer 47a in which the throat height defining insulating layer is placed.

Next, the write gap layer 44 around the pole portion layer 47a is selectively etched through dry etching, using the pole portion layer 47a as a mask. Next, the pole portion layer 40a of the bottom pole layer 40 around the pole portion layer 47a is selectively etched by about 0.3 to 0.6 μm, using the pole portion layer 47a as a mask, through ion milling using an argon-base gas, for example. A trim structure as shown in FIG. 12B is thus formed. The width of the pole portion layer 47a and the width of the pole portion layer 40a measured at the air bearing surface 30 may be made equal throughout the thickness. In this case, the write gap layer 44 and the pole portion layer 40a around the pole portion layer 47a may be etched, using the pole portion layer 47a as a mask. Alternatively, the pole portion layer 47a, the write gap layer 44 and the pole portion layer 40a may be etched, using a mask layer formed on the pole portion layer 47a as a mask.

Figures 13A, 13B:
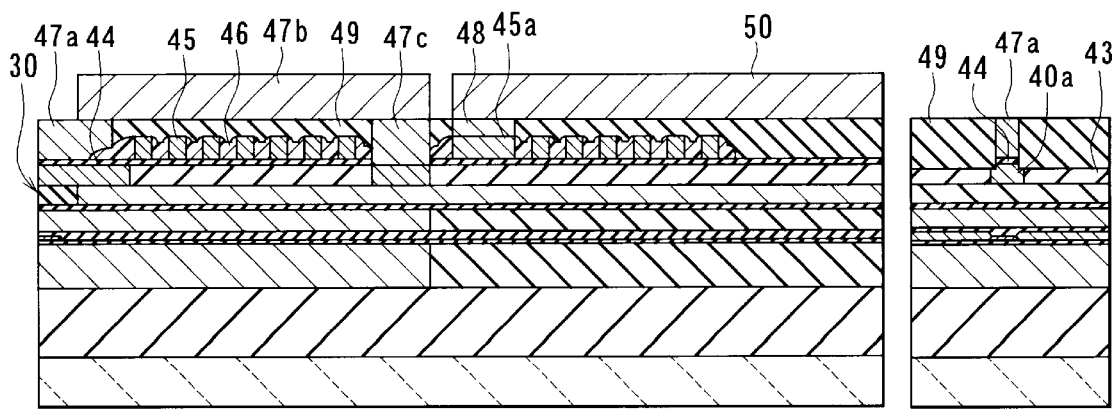
FIG. 13A and FIG. 13B are cross sections for illustrating a step that follows FIG. 12A and FIG. 12B.

Next, as shown in FIG. 13A and FIG. 13B, a coil insulating layer 49 of alumina, for example, having a thickness of about 3 to 4 μm is formed over the entire surface. The coil insulating layer 49 is then polished through CMP, for example, so that the pole portion layer 47a, the connecting portion layer 47c and the connecting layer 48 are exposed, and the surface is flattened.

Next, the yoke portion layer 47b having a thickness of 2.0 to 3.0 μm, for example, is formed to be the yoke portion of the top pole layer 47 on the pole portion layer 47a, the coil insulating layer 49 and the connecting portion layer 47c. At the same time, the lead layer 50, having a thickness of 2.0 to 3.0 μm, for example, to be connected to the connecting layer 48 is formed on the coil insulating layer 49. The material and the method of forming the yoke portion layer 47b and the lead layer 50 are similar to those of the yoke portion layer 17b of the first embodiment. An end of the yoke portion layer 47b that faces toward the air bearing surface 30 is located at a distance from the air bearing surface 30.

Figures 14A, 14B:
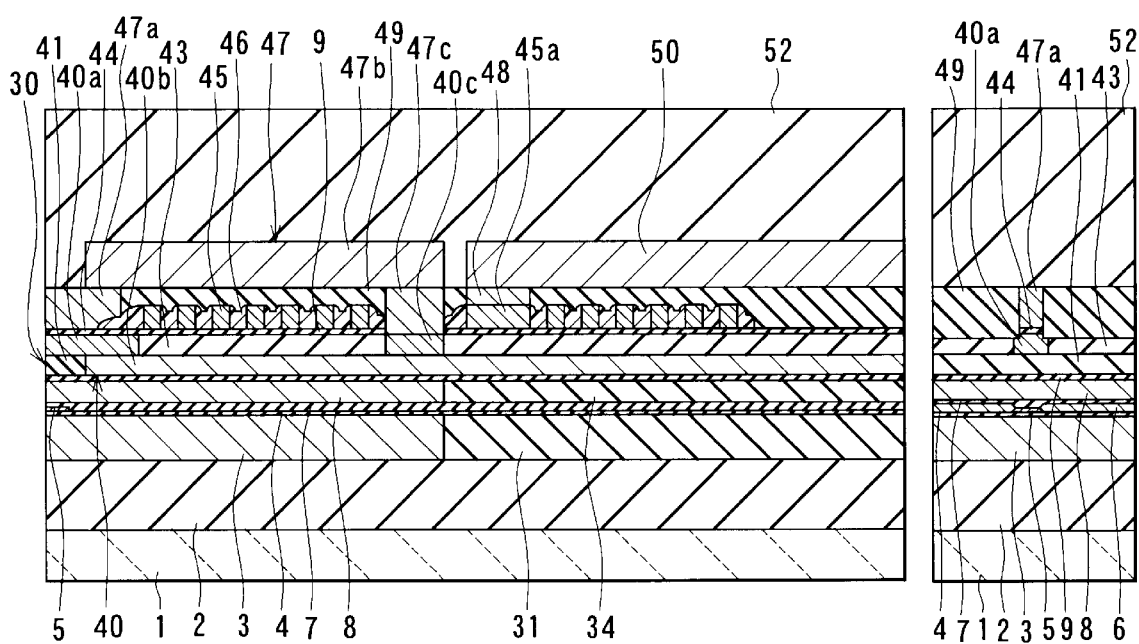
FIG. 14A and FIG. 14B are cross sections of the thin-film magnetic head of the second embodiment.

Next, as shown in FIG. 14A and FIG. 14B, an overcoat layer 52 of alumina, for example, having a thickness of 20 to 40 μm, for example, is formed over the entire surface. The surface of the overcoat layer 52 is flattened and pads (not shown) for electrodes are formed on the overcoat layer 52. Finally, lapping of the slider including the foregoing layers is performed to form the air bearing surfaces 30 of the thin-film magnetic head including the write head and the read head. The thin-film magnetic head of the embodiment is thus completed.

In the second embodiment the bottom pole layer 40 corresponds to the first magnetic layer of the invention. The top pole layer 47 corresponds to the second magnetic layer of the invention.

According to the second embodiment, the thin-film coil 45 is located on a side of the pole portion layer 47a of the top pole layer 47. In addition, the top surface of the coil insulating layer 49 that covers the coil 45 is flattened together with the top surface of the pole portion layer 47a, and the yoke portion layer 47b of the top pole layer 47 is formed on the flat coil insulating layer 49. As a result, the yoke portion layer 47b is formed with accuracy.

The remainder of the configuration, functions and effects of the second embodiment are similar to those of the first embodiment.

Third Embodiment

Reference is now made to FIG. 15A to FIG. 18A and FIG. 15B to FIG. 18B to describe a thin-film magnetic head and a method of manufacturing the same of a third embodiment of the invention. FIG. 15A to FIG. 18A are cross sections orthogonal to the air bearing surface. FIG. 15B to FIG. 18B are cross sections of pole portions parallel to the air bearing surface.

The thin-film magnetic head of the third embodiment is, as the head of the second embodiment, an example in which the thin-film coil is made up of a single layer, and the throat height is defined on a side of the top pole layer. The steps of the method of manufacturing the thin-film magnetic head of the third embodiment that are taken until the write gap layer 44 is formed and the contact hole 44A is formed therein are similar to those of the second embodiment.

Figures 15A, 15B:
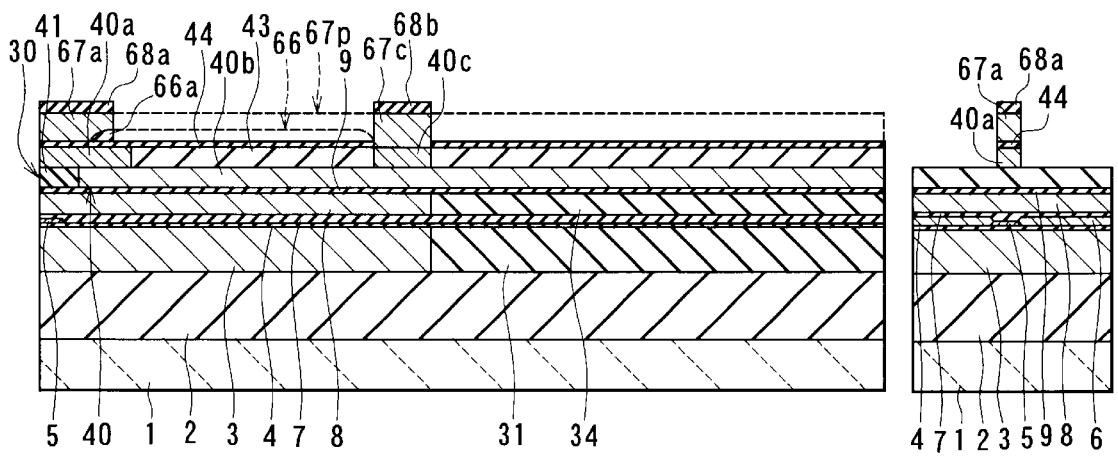
FIG. 15A and FIG. 15B are cross sections for illustrating a step of a method of manufacturing a thin-film magnetic head of a third embodiment of the invention.

In the following step of the method of the third embodiment, as shown in FIG. 15A and FIG. 15B, an insulating layer 66 of alumina, for example, having a thickness of 0.8 μm, for example, is formed on a portion of the write gap layer 44 that extends from a neighborhood of the contact hole 44A to a point located at a specific distance from the air bearing surface 30.

Next, a high saturation flux density material such as FeN or FeCo is sputtered over the entire surface to form a film 67p to be patterned that has a thickness of 1.5 to 2.0 μm, for example. Mask layers 68a and 68b made of an insulating material such as alumina and having specific shapes and a thickness of 1.0 μm, for example, are formed on the film 67p. The mask layer 68a is formed on a portion of the film 67p to be a pole portion layer 67a described later. The mask layer 68b is formed on a portion of the film 67p located in the contact hole 44A. The mask layers 68a and 68b may be formed through making a patterned metal layer on an alumina layer, and etching the alumina layer by RIE, using the metal layer as a mask.

Next, the film 67p and the insulating layer 66 are etched by RIE, using the mask layers 68a and 68b as masks. The film 67p is thereby patterned, and the pole portion layer 67a including the pole portion of the top pole layer 67 is formed and a connecting portion layer 67c to be connected to the bottom pole layer 40 is formed. In addition, the insulating layer 66 is patterned and a throat height defining insulating layer 66a is formed. The insulating layer encasing portion is the portion of the pole portion layer 67a in which the insulating layer 66a is placed. The top pole layer 67 is made up of the pole portion layer 67a and the connecting portion layer 67c, and a yoke portion layer 67b described later.

Next, the write gap layer 44 and the pole portion layer 40a of the bottom pole layer 40 around the pole portion layer 67a are etched by RIE, using the mask layer 68a as a mask. A trim structure as shown in FIG. 15B is thus formed.

Figures 16A, 16B:
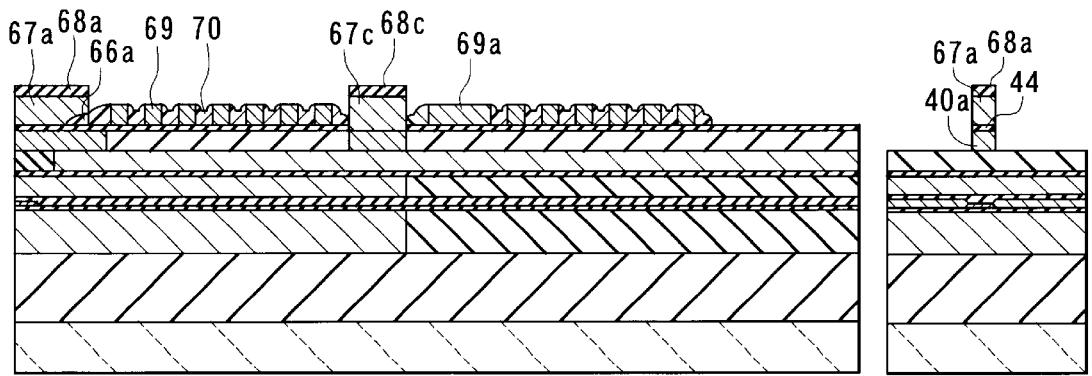
FIG. 16A and FIG. 16B are cross sections for illustrating a step that follows FIG. 15A and FIG. 15B.

Next, as shown in FIG. 16A and FIG. 16B, the thin-film coil 69 made of copper, for example, is formed by frame plating on the write gap layer 44. For example, the thickness of the coil 69 is 1.0 to 2.0 μm and the pitch is 1.2 to 2.0 μm. The coil 69 is wound around the connecting portion layer 68c. In the drawings numeral 69a indicates a portion for connecting the coil 69 to a lead layer 72 described later. Next, a photoresist layer 70 is formed to surround the coil 69.

Figures 17A, 17B:
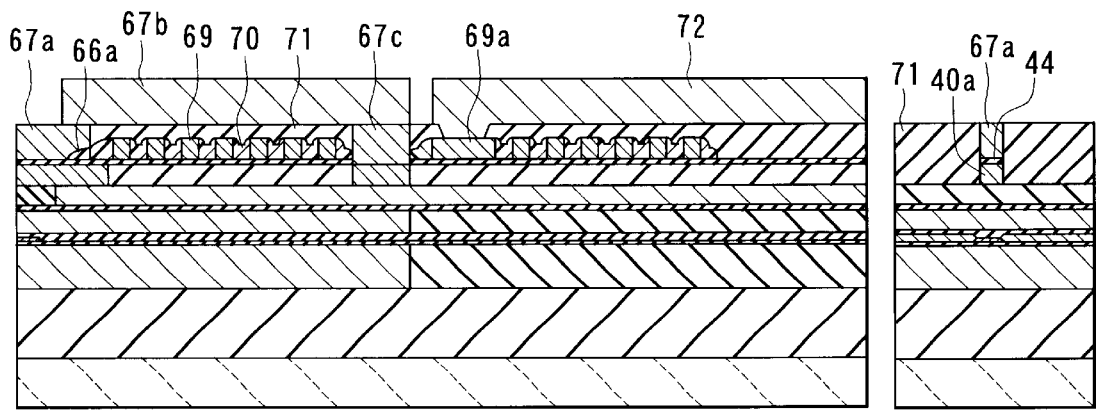
FIG. 17A and FIG. 17B are cross sections for illustrating a step that follows FIG. 16A and FIG. 16B.

Next, as shown in FIG. 17A and FIG. 17B, a coil insulating layer 71 of alumina, for example, having a thickness of about 3 to 4 μm is formed over the entire surface. The coil insulating layer 71 is then polished through CMP, for example, so that the pole portion layer 67a and the connecting portion layer 67c are exposed, and the surface is flattened. Next, a portion of the coil insulating layer 71 located on the connecting portion 69a of the thin-film coil 69 is etched to form a contact hole.

Next, the yoke portion layer 67b having a thickness of 2.0 to 3.0 μm, for example, is formed to be the yoke portion of the top pole layer 67 on the pole portion layer 67a, the coil insulating layer 71 and the connecting portion layer 67c. At the same time, the lead layer 72, having a thickness of 2.0 to 3.0 μm, for example, to be connected to the connecting portion 69a of the coil 69 is formed on the coil insulating layer 71. The material and the method of forming the yoke portion layer 67b and the lead layer 72 are similar to those of the yoke portion layer 17b of the first embodiment. An end of the yoke portion layer 67b that faces toward the air bearing surface 30 is located at a distance from the air bearing surface 30.

Figures 18A, 18B:
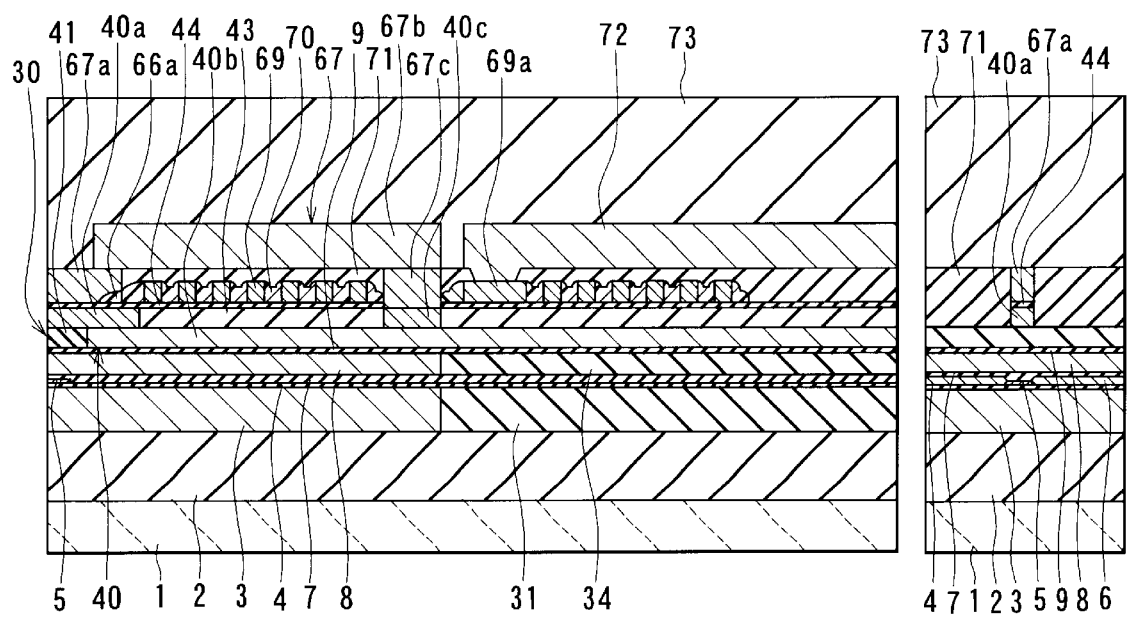
FIG. 18A and FIG. 18B are cross sections of the thin-film magnetic head of the third embodiment.

Next, as shown in FIG. 18A and FIG. 18B, an overcoat layer 73 of alumina, for example, having a thickness of 20 to 40 μm, for example, is formed over the entire surface. The surface of the overcoat layer 73 is flattened and pads (not shown) for electrodes are formed on the overcoat layer 73. Finally, lapping of the slider including the foregoing layers is performed to form the air bearing surfaces 30 of the thin-film magnetic head including the write head and the read head. The thin-film magnetic head of the embodiment is thus completed.

In the third embodiment the top pole layer 67 corresponds to the second magnetic layer of the invention.

According to the third embodiment, the pole portion layer 67a of the top pole layer 67, the write gap layer 44, and the pole portion layer 40a of the bottom pole layer 40 may be etched by focused ion beams, instead of etching these layers by RIE.

The remainder of the configuration, functions and effects of the third embodiment are similar to those of the second embodiment.

Fourth Embodiment

Reference is now made to FIG. 19A to FIG. 25A and FIG. 19B to FIG. 25B to describe a thin-film magnetic head and a method of manufacturing the same of a fourth embodiment of the invention. FIG. 19A to FIG. 25A are cross sections orthogonal to the air bearing surface. FIG. 19B to FIG. 25B are cross sections of pole portions parallel to the air bearing surface.

The steps of the method of manufacturing the thin-film magnetic head of the fourth embodiment that are taken until the insulating film 9 is formed are similar to those of the first embodiment.

Figures 19A, 19B:
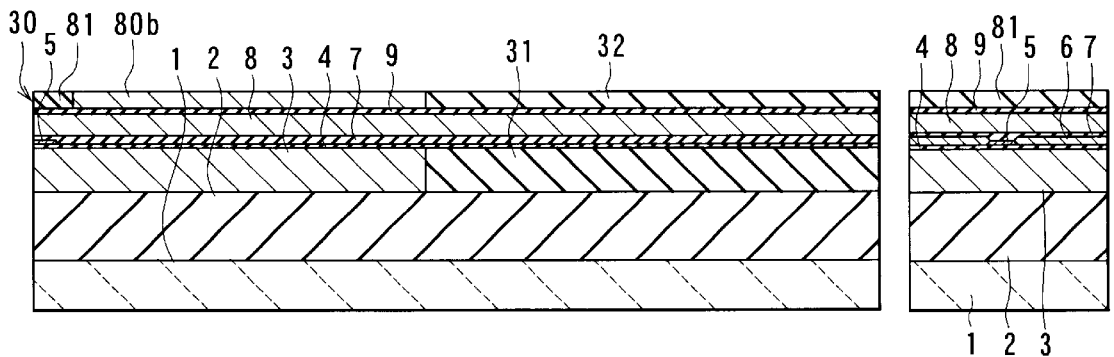
FIG. 19A and FIG. 19B are cross sections for illustrating a step of a method of manufacturing a thin-film magnetic head of a fourth embodiment of the invention.

In the following step of the method of the fourth embodiment, as shown in FIG. 19A and FIG. 19B, a yoke portion layer 80b made of a magnetic material and having a thickness of 1.0 to 1.5 μm, for example, is selectively formed on the insulating film 9 to be a yoke portion of a bottom pole layer 80 of the write head. The bottom pole layer 80 is made up of the yoke portion layer 80b, and a pole portion layer 80a and a connecting portion layer 80c that will be described later. An end of the yoke portion layer 80b that faces toward the air bearing surface 30 is located at a distance from the air bearing surface 30. The material and the method of forming the yoke portion layer 80b are similar to those of the yoke portion layer 10b of the first embodiment.

Next, an insulating layer of alumina, for example, having a thickness of about 2 to 3 μm is formed over the entire surface, and polished through CMP, for example, so that the yoke portion layer 80b is exposed, and the surface is flattened. As a result, an insulating layer 81 that extends from the air bearing surface 30 to the end of the yoke portion layer 80b that faces toward the air bearing surface 30 is formed on the insulating film 9, as shown in FIG. 19A and FIG. 19B. The insulating layer 32 is formed in the other portion on the insulating film 9.

Figures 20A, 20B:
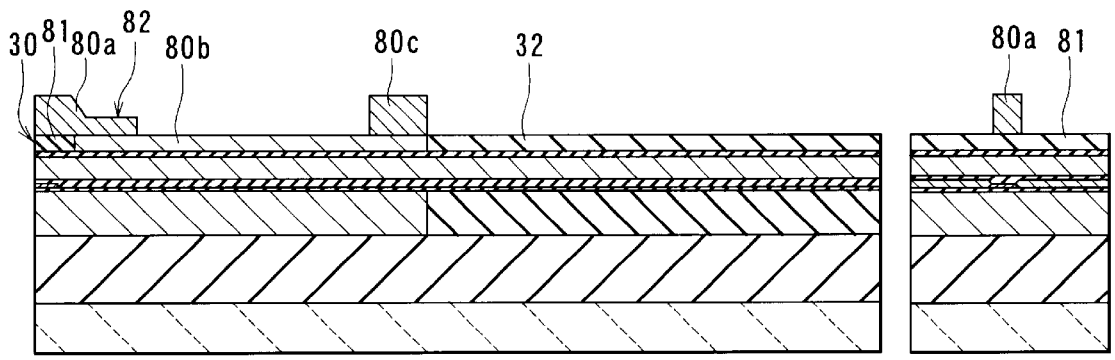
FIG. 20A and FIG. 20B are cross sections for illustrating a step that follows FIG. 19A and FIG. 19B.

Next, as shown in FIG. 20A and FIG. 20B, the pole portion layer 80a of the bottom pole layer 80 is formed on the insulating layer 81 and the yoke portion layer 80b, and the connecting portion layer 80c is formed on the yoke portion layer 80b. The pole portion layer 80a includes the pole portion of the bottom pole layer 80. The connecting portion layer 80c is located near the center of a thin-film coil described later. Each of the pole portion layer 80a and the connecting portion layer 80c has a thickness of 1.0 to 1.5 μm, for example. The material and the method of forming the pole portion layer 80a and the connecting portion layer 80c are similar to those of the pole portion layer 10a and the connecting portion layer 10c of the first embodiment.

Next, a portion of the top surface of the pole portion layer 80a that extends from a desired zero throat height level to a side farther from the air bearing surface 30 is etched through ion milling, for example, only by 0.3 to 0.6 μm, for example. As a result, an insulating layer encasing portion 82 is formed in the portion of the pole portion layer 80a that extends from the zero throat height level to the side farther from the air bearing surface 30. In the insulating layer encasing portion 82 a throat height defining insulating layer described later that defines the throat height will be placed.

Figures 21A, 21B:
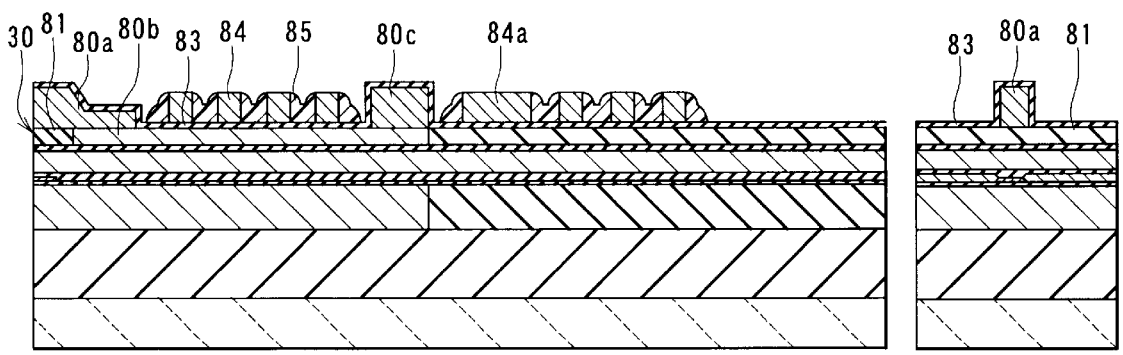
FIG. 21A and FIG. 21B are cross sections for illustrating a step that follows FIG. 20A and FIG. 20B.

Next, as shown in FIG. 21A and FIG. 21B, an insulating film 83 of alumina, for example, having a thickness of about 0.3 to 0.5 μm is formed over the entire surface.

Next, a first layer 84 of the thin-film coil made of copper, for example, is formed by frame plating on the insulating film 83. For example, the thickness of the first layer 84 is 0.8 to 1.0 μm. The first layer 84 of the coil is wound around the connecting portion layer 80c. In the drawings numeral 84a indicates a portion for connecting the first layer 84 to a second layer 88 of the coil described later. Next, a photoresist layer 85 is formed to surround the first layer 84.

Figures 22A, 22B:
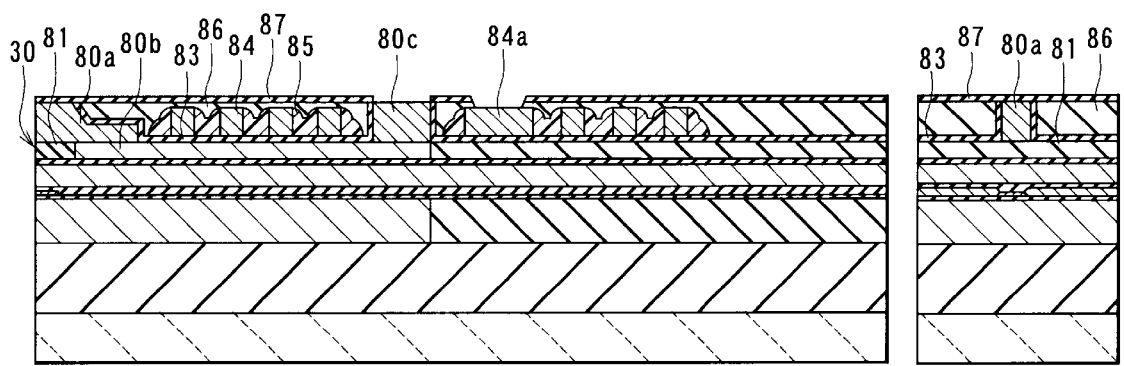
FIG. 22A and FIG. 22B are cross sections for illustrating a step that follows FIG. 21A and FIG. 21B.

Next, as shown in FIG. 22A and FIG. 22B, a coil insulating layer 86 of alumina, for example, having a thickness of about 3 to 4 μm is formed over the entire surface, and polished through CMP, for example, so that the pole portion layer 80a and the connecting portion layer 80c of the bottom pole layer 80 are exposed, and the surface is flattened. Although the first layer 84 of the coil is not exposed in FIG. 22A and FIG. 22B, it may be exposed. A portion of the coil insulating layer 86 placed in the insulating layer encasing portion 82 is the throat height defining insulating layer.

Next, a write gap layer 87 made of an insulating material whose thickness is 0.1 to 0.15 μm, for example, is formed on the entire surface. The material and the method of forming the write gap layer 87 are similar to those of the write gap layer 14 of the first embodiment.

Next, a portion of the write gap layer 87 located on the connecting portion layer 80c and the connecting portion 84a is etched to form a contact hole.

Figures 23A, 23B:
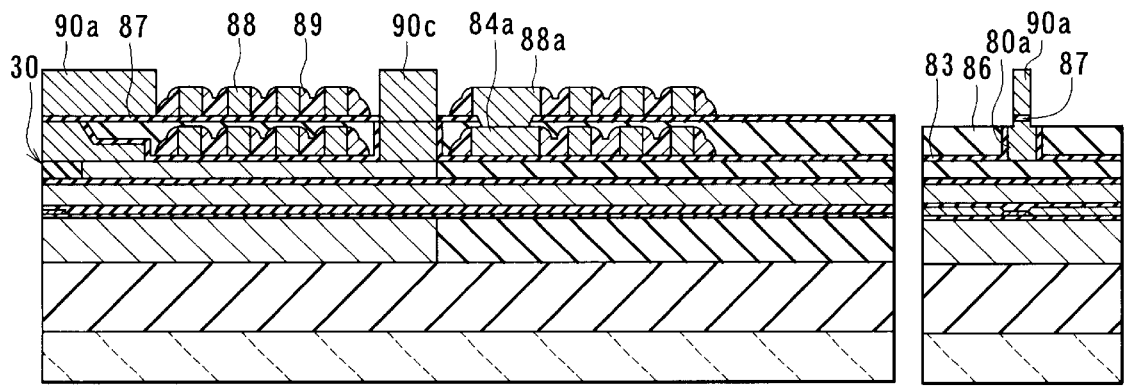
FIG. 23A and FIG. 23B are cross sections for illustrating a step that follows FIG. 22A and FIG. 22B.

Next, as shown in FIG. 23A and FIG. 23B, the second layer 88 of the thin-film coil made of copper, for example, is formed by frame plating on the write gap layer 87. For example, the thickness of the second layer 88 is 0.8 to 1.0 μm. The second layer 88 of the coil is wound around the connecting portion layer 80c. In the drawings numeral 88a indicates a portion for connecting the second layer 88 to the first layer 84 of the coil. Next, a photoresist layer 89 is formed to surround the second layer 88.

Next, a pole portion layer 90a that includes the pole portion of a top pole layer 90 is formed on a portion of the write gap layer 87 near an end thereof closer to the air bearing surface 30. At the same time, a connecting portion layer 90c is formed on the connecting portion layer 80c of the bottom pole layer 80. The pole portion layer 90a and the connecting portion layer 90c are made of the same magnetic material and each of them has a thickness of 2 to 3 μm, for example. The top pole layer 90 is made up of the pole portion layer 90a and the connecting portion layer 90c, and a yoke portion layer 90b described later.

The material and the method of forming the pole portion layer 90a and the connecting portion layer 90c are similar to those of the pole portion layer 17a and the connecting portion layer 17c of the first embodiment.

Next, the write gap layer 87 around the pole portion layer 90a is selectively etched through dry etching, using the pole portion layer 90a as a mask. Next, the pole portion layer 80a of the bottom pole layer 80 around the pole portion layer 90a is selectively etched by about 0.3 to 0.6 μm, using the pole portion layer 90a as a mask, through ion milling using an argon-base gas, for example. A trim structure as shown in FIG. 23B is thus formed. The width of the pole portion layer 90a and the width of the pole portion layer 80a measured at the air bearing surface 30 may be made equal throughout the thickness. In this case, the write gap layer 87 and the pole portion layer 80a around the pole portion layer 90a may be etched, using the pole portion layer 90a as a mask. Alternatively, the pole portion layer 90a, the write gap layer 87 and the pole portion layer 80a may be etched, using a mask layer formed on the pole portion layer 90a as a mask.

Figures 24A, 24B:
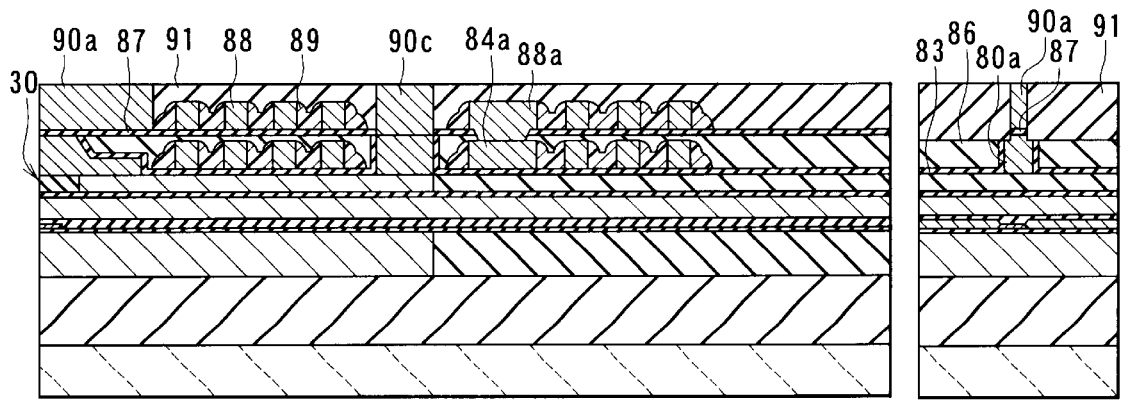
FIG. 24A and FIG. 24B are cross sections for illustrating a step that follows FIG. 23A and FIG. 23B.

Next, as shown in FIG. 24A and FIG. 24B, a coil insulating layer 91 of alumina, for example, having a thickness of about 3 to 4 μm is formed over the entire surface. The coil insulating layer 91 is then polished through CMP, for example, so that the pole portion layer 90a and the connecting portion layer 90c are exposed, and the surface is flattened.

Figures 25A, 25B:
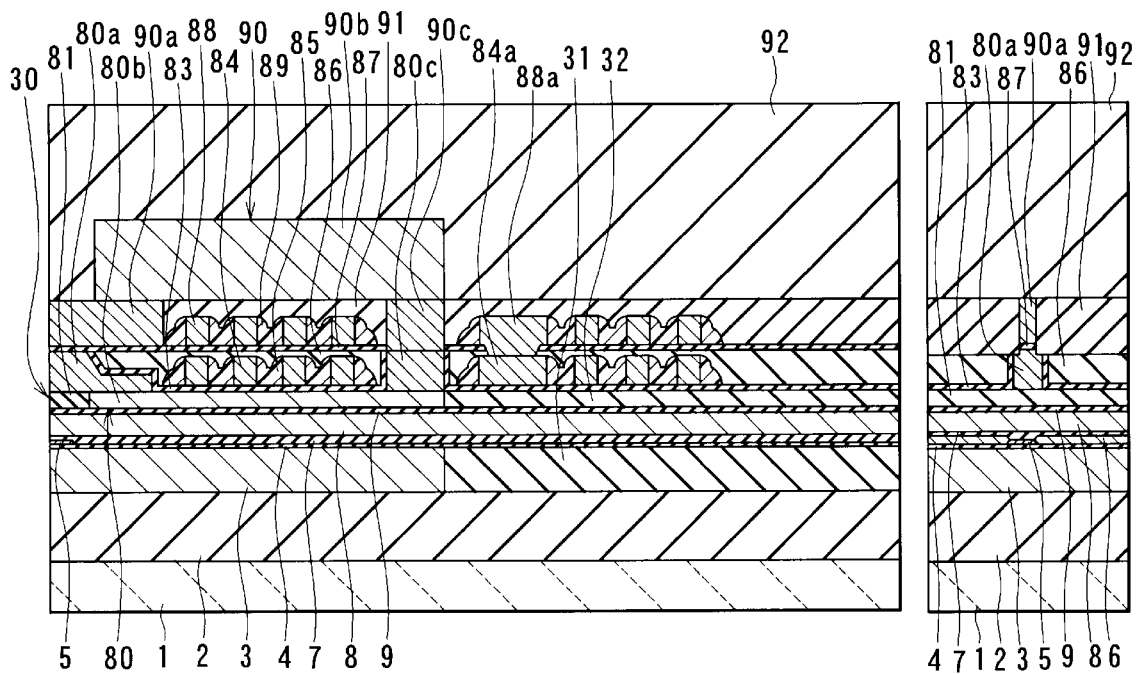
FIG. 25A and FIG. 25B are cross sections of the thin-film magnetic head of the fourth embodiment.

Next, as shown in FIG. 25A and FIG. 25B, the yoke portion layer 90b having a thickness of 2.0 to 3.0 μm, for example, is formed to be the yoke portion of the top pole layer 90 on the pole portion layer 90a, the coil insulating layer 91 and the connecting portion layer 90c. An end of the yoke portion layer 90b that faces toward the air bearing surface 30 is located at a distance from the air bearing surface 30. The material and the method of forming the yoke portion layer 90b are similar to those of the yoke portion layer 17b of the first embodiment.

Next, an overcoat layer 92 of alumina, for example, having a thickness of 20 to 40 μm, for example, is formed over the entire surface. The surface of the overcoat layer 92 is flattened and pads (not shown) for electrodes are formed on the overcoat layer 92. Finally, lapping of the slider including the foregoing layers is performed to form the air bearing surfaces 30 of the thin-film magnetic head including the write head and the read head. The thin-film magnetic head of the embodiment is thus completed.

In the fourth embodiment the bottom pole layer 80 corresponds to the first magnetic layer of the invention. The top pole layer 90 corresponds to the second magnetic layer of the invention.

According to the fourth embodiment, the first layer 84 of the thin-film coil is located on a side of the pole portion layer 80a of the bottom pole layer 80 and formed on the flat insulating film 83. It is thereby possible to form the first layer 84 having minute dimensions with accuracy. According to the embodiment, an end of the first layer 84 is formed near the end of the pole portion layer 80a located farther from the air bearing surface 30.

According to the embodiment, the first layer 84 of the coil is located on a side of the pole portion layer 80a of the bottom pole layer 80. In addition, the top surface of the coil insulating layer 86 that covers the first layer 84 is flattened together with the top surface of the pole portion layer 80a, and the second layer 88 of the coil is formed on the write gap layer 87 formed on the flattened surface. As a result, the second layer 88 having minute dimensions is formed with accuracy, too. According to the embodiment, an end of the second layer 88 is formed near the end of the pole portion layer 90a of the top pole layer 90 located farther from the air bearing surface 30.

According to the embodiment as thus described, it is possible to reduce the yoke length of the write head.

According to the embodiment, both of the pole portion layer 90a and the yoke portion layer 90b of the top pole layer 90 are formed on a flattened surface. It is thereby possible to form the pole portion layer 90a and the yoke portion layer 90b having minute dimensions with accuracy.

The remainder of the configuration, functions and effects of the fourth embodiment are similar to those of the first embodiment.

Fifth Embodiment

Reference is now made to FIG. 26A to FIG. 31A, FIG. 26B to FIG. 31B, and FIG. 32 to describe a thin-film magnetic head and a method of manufacturing the same of a fifth embodiment of the invention. FIG. 26A to FIG. 31A are cross sections orthogonal to the air bearing surface. FIG. 26B to FIG. 31B are cross sections of pole portions parallel to the air bearing surface.

The steps of the method of manufacturing the thin-film magnetic head of the fifth embodiment that are taken until the insulating film 9 is formed are similar to those of the second embodiment, as shown in FIG. 26A and FIG. 26B.

In the following step of the method of the fifth embodiment, as shown in FIG. 27A and FIG. 27B, a yoke portion layer 110b made of a magnetic material and having a thickness of 1.0 to 1.5 µm, for example, is selectively formed on the insulating film 9 to be a yoke portion of a bottom pole layer 110 of the write head. The bottom pole layer 110 is made up of the yoke portion layer 110b, and a pole portion layer 110a and a connecting portion layer 110c that will be described later. An end of the yoke portion layer 110b that faces toward the air bearing surface 30 is located at a distance from the air bearing surface 30.

The yoke portion layer 110b may be made of NiFe (80 weight % Ni and 20 weight % Fe), or NiFe (45 weight % Ni and 55 weight % Fe) that is a high saturation flux density material and formed through plating, or may be made of a material such as FeN or FeZrN that is a high saturation flux density material through sputtering. Alternatively, a material such as CoFe or a Co-base amorphous material that is a high saturation flux density material may be used.

Next, an insulating layer of alumina, for example, having a thickness of about 2 to 3 µm is formed over the entire surface, and polished through CMP, for example, so that the yoke portion layer 110b is exposed, and the surface is flattened. As a result, an insulating layer 111 that extends from the air bearing surface 30 to the end of the yoke portion layer 110b that faces toward the air bearing surface 30 is formed on the insulating film 9, as shown in FIG. 27A and FIG. 27B.

Figures 28A, 28B:
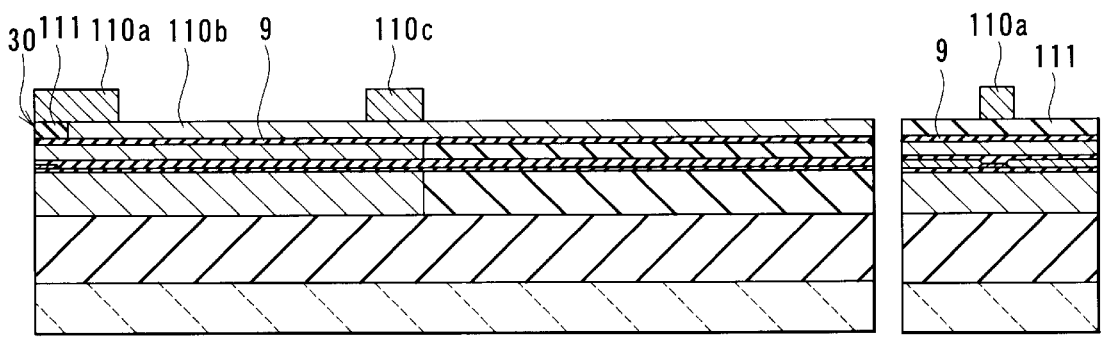
FIG. 28A and FIG. 28B are cross sections for illustrating a step that follows FIG. 27A and FIG. 27B.

Next, as shown in FIG. 28A and FIG. 28B, the pole portion layer 110a of the bottom pole layer 110 is formed on the insulating layer 111 and the yoke portion layer 110b, and the connecting portion layer 110c is formed on the yoke portion layer 110b. The pole portion layer 110a includes the pole portion of the bottom pole layer 110. The connecting portion layer 110c is located near the center of a thin-film coil described later. Each of the pole portion layer 110a and the connecting portion layer 110c has a thickness of 1.0 to 1.5 µm, for example.

The pole portion layer 110a and the connecting portion layer 110c of the bottom pole layer 110 may be made of NiFe (80 weight % Ni and 20 weight % Fe), or NiFe (45 weight % Ni and 55 weight % Fe) that is a high saturation flux density material and formed through plating, or may be made of a material such as FeN or FeZrN that is a high saturation flux density material through sputtering. Alternatively, a material such as CoFe or a Co-base amorphous material that is a high saturation flux density material may be used.

Figures 29A, 29B:
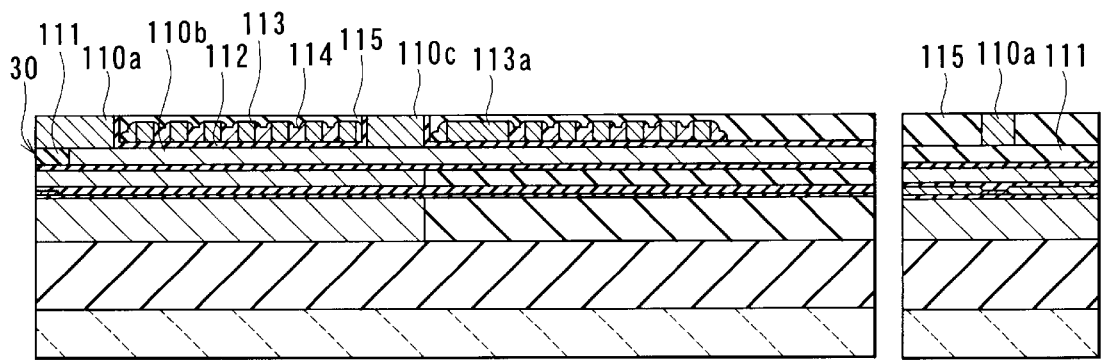
FIG. 29A and FIG. 29B are cross sections for illustrating a step that follows FIG. 28A and FIG. 28B.
Figure 38:
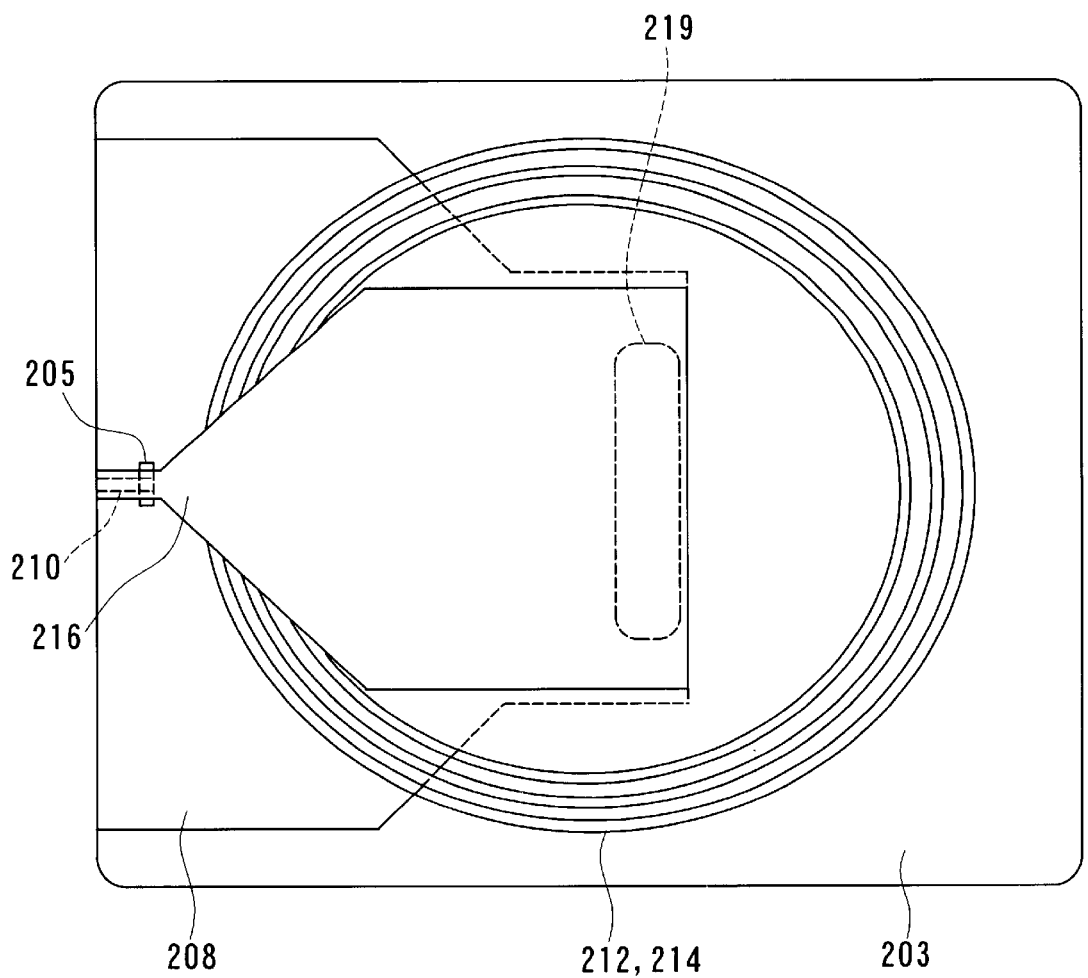
FIG. 38 is a top view of the related-art thin-film magnetic head.

Next, as shown in FIG. 29A and FIG. 29B, an insulating film 112 of alumina, for example, having a thickness of about 0.3 to 0.5 µm is formed over the entire surface. Next, the thin-film coil 113 made of copper, for example, is formed by frame plating on the insulating film 112. For example, the thickness of the coil 113 is 0.8 to 1.0 µm. The coil 113 is wound around the connecting portion layer 110c. In the drawings numeral 113a indicates a portion for connecting the coil 113 to a lead layer 119 described later. Next, a photoresist layer 114 is formed to surround the coil 113.

Next, a coil insulating layer 115 of alumina, for example, having a thickness of about 3 to 4 µm is formed over the entire surface, and polished through CMP, for example, so that the pole portion layer 110a and the connecting portion layer 110c of the bottom pole layer 110 are exposed, and the surface is flattened. Although the coil 113 is not exposed in FIG. 29A and FIG. 29B, it may be exposed.

Next, as shown in FIG. 30A and FIG. 30B, an insulating layer 116 of alumina, for example, having a thickness of 0.8 µm, for example, is formed for defining the throat height on the entire surface except a portion that extends from the air bearing surface 30 to a point at a specific distance from the air bearing surface 30.

Next, a write gap layer 117 made of an insulating material whose thickness is 0.1 to 0.15 µm, for example, is formed on the entire surface. An insulating material used for the write gap layer 117 may be any of alumina, aluminum nitride, a silicon-dioxide-base material, a silicon-nitride-base material, diamond-like carbon (DLC), and so on. The gap layer 117 may be fabricated through sputtering or CVD. If the gap layer 117 made of an alumina film is fabricated through CVD, trimethyl aluminum $(Al(CH_3)_3)$ and $H_2O$ are used, for example. Through the use of CVD, it is possible to make the thin and closely packed gap layer 117 with few pinholes.

Next, portions of the write gap layer 117 and the insulating layer 116 that are located on the connecting portion layer 110c of the bottom pole layer 110 and the connecting portion 113a of the coil 113 are etched to form contact holes.

Next, as shown in FIG. 31A and FIG. 31B, a top pole layer 118 having a thickness of 2.0 to 3.0 µm, for example, is formed on a portion of the write gap layer 117 that extends from the air bearing surface 30 to the top of the connecting portion layer 110c of the bottom pole layer 110. At the same time, the lead layer 119 having a thickness of 3 to 4 µm, for example, is formed to be connected to the connecting portion 113a of the coil 113. The top pole layer 118 is connected to the connecting portion layer 110c of the bottom pole layer 110.

The top pole layer 118 may be made of NiFe (80 weight % Ni and 20 weight % Fe), or NiFe (45 weight % Ni and 55 weight % Fe) that is a high saturation flux density material and formed through plating, or may be made of a material such as FeN or FeZrN that is a high saturation flux density material through sputtering. Alternatively, a material such as CoFe or a Co-base amorphous material that is a high saturation flux density material may be used. To improve the high frequency characteristic, the top pole layer 118 may be made of a number of layers of inorganic insulating films and magnetic layers of Permalloy, for example.

Next, the write gap layer 117 around the pole portion of the top pole layer 118 is selectively etched through dry etching, using the top pole layer 118 as a mask. This dry etching may be RIE using a chlorine-base gas such as $BCl_2$ or $Cl_2$, or a fluorine-base gas such as $CF_4$ or $SF_6$, for example. Next, the pole portion layer 110a of the bottom pole layer 110 around the pole portion of the top pole layer 118 is selectively etched by about 0.3 to 0.6 µm, using the top pole layer 118 as a mask, through ion milling using an argon-base gas, for example. A trim structure as shown in FIG. 31B is thus formed. The trim structure suppresses an increase in the effective track width due to expansion of a magnetic flux generated during writing in a narrow track.

Next, an overcoat layer 120 of alumina, for example, having a thickness of 20 to 40 µm, for example, is formed over the entire surface. The surface of the overcoat layer 120 is flattened and pads (not shown) for electrodes are formed on the overcoat layer 120. Finally, lapping of the slider including the foregoing layers is performed to form the air bearing surfaces 30 of the thin-film magnetic head including the write head and the read head. The thin-film magnetic head of the embodiment is thus completed.

FIG. 32 is a perspective view that illustrates a neighborhood of the pole portions of the bottom pole layer 110 and the top pole layer 118 of the thin-film magnetic head of the fifth embodiment.

In the fifth embodiment the bottom pole layer 110 corresponds to the first magnetic layer of the invention. The top pole layer 118 corresponds to the second magnetic layer of the invention.

As described so far, the thin-film magnetic head of the fifth embodiment comprises: the medium facing surface (the air bearing surface 30) that faces toward a recording medium; the read head; and the write head (the induction-type electromagnetic transducer). The read head and the write head are magnetically insulated from each other by the insulating film 9.

The read head incorporates: the MR element 5; and the bottom shield layer 3 and the top shield layer 8 for shielding the MR element 5. Portions of the bottom shield layer 3 and the top shield layer 8 that are located on a side of the air bearing surface 30 are opposed to each other, the MR element 5 being placed between these portions.

The write head incorporates the bottom pole layer 110 and the top pole layer 118 magnetically coupled to each other, each of which includes at least one layer. The bottom pole layer 110 and the top pole layer 118 include the pole portions that are opposed to each other and placed in regions on a side of the air bearing surface 30. The write head further incorporates: the write gap layer 117 placed between the pole portions of the two pole layers 110 and 118; and the thin-film coil 113 at least a part of which is placed between the two pole layers 110 and 118 and insulated from the two pole layers 110 and 118.

The bottom pole layer 110 includes the pole portion layer 110a and the yoke portion layer 110b. The pole portion layer 110a includes the pole portion of the bottom pole layer 110 and has surfaces one of which (the top surface) is adjacent to the write gap layer 117. The yoke portion layer 110b is the yoke portion of the bottom pole layer 110 and is connected to the other surface (the bottom surface) of the pole portion layer 110a. The yoke portion layer 110b has an end facing toward the air bearing surface 30 that is located at a distance from the air bearing surface 30. The insulating layer 111 is located between the air bearing surface 30 and the end of the yoke portion layer 110b that faces toward the air bearing surface 30. The top pole layer 118 is made up of one layer having a portion that defines the track width.

As shown in FIG. 32, the pole portion layer 110a of the bottom pole layer 110 includes a first portion $110a_1$ and a second portion $110a_2$. The first portion $110a_1$ has ends one of which is located in the air bearing surface 30. At least a part of the first portion $110a_1$ has a width equal to the write track width. The second portion $110a_2$ has a width greater than the write track width and is located farther from the air bearing surface 30 than the first portion $10a_1$.

The top pole layer 118 includes a first portion 118A, a second portion 118B and a third portion 118C in the order in which the closest to the air bearing surface 30 comes first. The first portion 118A has a width equal to the write track width. The second portion 118B has a width greater than the width of the first portion 118A. The third portion 118C has a width greater than the width of the second portion 118B. The width of the third portion 118C decreases as the distance from the air bearing surface 30 decreases.

The thin-film coil 113 is located on a side of the pole portion layer 110a of the bottom pole layer 110. The coil 113 is covered with the photoresist layer 114 and the coil insulating layer 115. The top surface of the coil insulating layer 115 is flattened, together with the top surface of the pole portion layer 110a.

According to the embodiment as thus described, the bottom pole layer 110 includes the pole portion layer 110a and the yoke portion layer 110b. As a result, it is possible to form the pole portion layer 110a including the pole portion that has minute dimensions with accuracy. According to the embodiment, the thin-film coil 113 is located on a side of the pole portion layer 110a of the bottom pole layer 110. In addition, the top surface of the coil insulating layer 115 that covers the coil 113 is flattened together with the top surface of the pole portion layer 110a, and the top pole layer 118 is formed on the insulating layer 116 and the write gap layer 117 that are formed on the flattened surface. As a result, the top pole layer 118 made up of one layer is made flat or nearly flat, and the top pole layer 118 including the pole portion and having minute dimensions is formed with accuracy.

According to the embodiment, the end of the yoke portion layer 110b of the bottom pole layer 110 that faces toward the air bearing surface 30 is located at a distance from the air bearing surface 30. Therefore, when the width of the pole portion of the top pole layer 118 and the width of the pole portion of the bottom pole layer 110 that are measured at the air bearing surface 30 are made equal, it is only required that the widths of the pole portions of the two layers including the top pole layer 118 and the pole portion layer 110a are made equal, while it is not necessary that the widths of the pole portions of three layers including the top pole layer 118, the pole portion layer 110a and the yoke portion layer 110b of the bottom pole layer are made equal. Therefore, according to the embodiment, it is easy to make the widths of the pole portions of the top pole layer 118 and the bottom pole layer 110 equal with accuracy.

As thus described, it is possible to form the pole portions of the write head (the induction-type electromagnetic transducer) with accuracy.

In this embodiment the end of the yoke portion layer 110*b* facing toward the air bearing surface 30 is located at a distance from the air bearing surface 30. As a result, the embodiment prevents 'side write', that is, writing of data in a region of a recording medium where data is not supposed to be written.

According to the embodiment, the top shield layer 8 of the read head and the bottom pole layer 110 of the write head are isolated from each other, and the insulating film 9 is located in between. As a result, the effect of residual magnetism created in the write head on the MR element 5 is reduced. Furthermore, according to the embodiment, the end of the yoke portion layer 110*b* of the bottom pole layer 110 facing toward the air bearing surface 30 is located at a distance from the air bearing surface 30. In addition, the insulating layer 111 is located between the air bearing surface 30 and the end of the yoke portion layer 110*b* that faces toward the air bearing surface 30. As a result, the pole portions of the write head and the MR element 5 of the read head are magnetically isolated from each other by the insulating layer 111. It is thereby possible to further reduce the effect of residual magnetism created in the write head on the MR element 5. The embodiment thus reduces the noise and variations in read signal of the read head resulting from writing of the write head.

According to the embodiment, the thin-film coil 113 is located on a side of the pole portion layer 110*a* of the bottom pole layer 110, and is formed on the flat insulating film 112. It is thereby possible to form the coil 113 having minute dimensions with accuracy. Furthermore, according to the embodiment, an end of the coil 113 is located near the end of the pole portion layer 110*a* farther from the air bearing surface 30. As thus described, according to the embodiment, the yoke length is made shorter than that of the prior-art head. Furthermore, it is possible to prevent the magnetomotive force generated by the thin-film coil 113 from saturating halfway, and to utilize this magnetomotive force for writing with efficiency. It is thus possible to provide the thin-film magnetic head having the write head with an excellent high frequency characteristic, an excellent nonlinear transition shift (NLTS) characteristic and an excellent overwrite property that is a parameter indicating one of characteristics when data is written over existing data.

According to the embodiment, the thin-film coil 113 is located on a side of the pole portion layer 110*a* of the bottom pole layer 110. In addition, the top surface of the coil insulating layer 115 that covers the coil 113 is flattened together with the top surface of the pole portion layer 110*a*. It is thereby possible to form a layer adjacent to the coil insulating layer 115 with accuracy.

According to the embodiment, the thin-film coil 113 is located on a side of the pole portion layer 110*a* of the bottom pole layer 110. It is thereby possible that the top pole layer 118 is made up of one layer that is nearly flat. It is thus possible that the number of manufacturing steps are smaller than the case in which the top pole layer is made up of a plurality of layers.

Sixth Embodiment

Reference is now made to FIG. 33A and FIG. 33B to describe a thin-film magnetic head and a method of manufacturing the same of a sixth embodiment of the invention. FIG. 33A and FIG. 33B illustrate the configuration of the thin-film magnetic head of the embodiment. FIG. 33A is a cross section orthogonal to the air bearing surface. FIG. 33B is a cross section of pole portions parallel to the air bearing surface.

According to the sixth embodiment, as shown in FIG. 33B, the width of the top pole layer 118 and the width of the pole portion layer 110*a* measured at the air bearing surface 30 are made equal through out the thickness. To make these widths equal, the write gap layer 117 and the pole portion layer 110*a* may be etched, using the top pole layer 118 as a mask. Alternatively, the top pole layer 118, the write gap layer 117 and the pole portion layer 110*a* may be etched, using a mask layer formed on the top pole layer 118 as a mask. The etching method may be RIE. The mask layer may be formed through making a patterned metal layer on an alumina layer, and etching the alumina layer by RIE, using the metal layer as a mask.

According to the embodiment, the top pole layer 118, the write gap layer 117 and the pole portion layer 110*a* of the bottom pole layer 110 may be etched by focused ion beams.

The remainder of the configuration, functions and effects of the sixth embodiment are similar to those of the fifth embodiment.

The present invention is not limited to the foregoing embodiments but may be practiced in still other ways. In the foregoing embodiments, for example, the thin-film magnetic heads are disclosed, comprising the MR element for reading formed on the base body and the induction-type electromagnetic transducer for writing stacked on the MR element. Alternatively, the MR element may be stacked on the magnetic transducer.

That is, the induction-type electromagnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing toward the bottom pole layer with a recording gap film in between.

The invention may be applied to a thin-film magnetic head dedicated to writing that has an induction-type electromagnetic transducer only or to a thin-film magnetic head performing writing and reading through an induction-type electromagnetic transducer.

According to the thin-film magnetic head or the method of manufacturing the same of the invention described so far, the first magnetic layer includes the first pole portion layer and the first yoke portion layer. In addition, an end of the first yoke portion layer that faces toward the medium facing surface is located at a distance from the medium facing surface. As a result, according to the invention, it is possible to form the first pole portion layer of the first magnetic layer with accuracy, and it is thereby possible to form the pole portion with accuracy. According to the invention, since the end of the first yoke portion layer that faces toward the medium facing surface is located at a distance from the medium facing surface, it is possible to prevent writing of data in a region where data is not supposed to be written. According to the invention, the end of the first yoke portion layer that faces toward the medium facing surface is located at a distance from the medium facing surface, so that the pole portion of the write head and the magnetoresistive element of the read head are magnetically isolated from each other. As a result, according to the invention, it is possible to reduce the noise and variations in read signal of the read head resulting from writing of the write head.

According to the thin-film magnetic head or the method of manufacturing the same of the invention, at least a part of the thin-film coil may be located on a side of the first pole portion layer. In this case, it is possible to place an end of at least a part of the coil near an end of the first pole portion layer, and it is thereby possible to reduce the yoke length.

According to the thin-film magnetic head or the method of manufacturing the same of the invention, it is possible to provide the coil insulating layer that covers at least a part of the thin-film coil located on a side of the first pole portion layer, and has a surface facing toward the gap layer, the surface being flattened together with the surface of the first pole portion layer that faces toward the gap layer. In this case, it is possible to form a layer adjacent to the coil insulating layer with accuracy.

According to the thin-film magnetic head or the method of manufacturing the same of the invention, the second magnetic layer may include the second pole portion layer and the second yoke portion layer. In addition, an end of the second yoke portion layer that faces toward the medium facing surface may be located at a distance from the medium facing surface. In this case, it is possible to form the two pole portion layers with accuracy, and it is thereby possible to form the pole portions of the induction-type electromagnetic transducer with accuracy. According to the invention, the end of each of the yoke portion layers that faces toward the medium facing surface is located at a distance from the medium facing surface. It is thereby possible to prevent writing of data in a region where data is not supposed to be written.

According to the thin-film magnetic head or the method of manufacturing the same of the invention, at least a part of the thin-film coil may be located on a side of the second pole portion layer. In this case, it is possible to place an end of at least a part of the coil near an end of the second pole portion layer, and it is thereby possible to reduce the yoke length.

According to the thin-film magnetic head or the method of manufacturing the same of the invention, it is possible to provide the coil insulating layer that covers at least a part of the thin-film coil located on a side of the second pole portion layer, and has a surface facing toward the second yoke portion layer, the surface being flattened together with the surface of the second pole portion layer that faces toward the second yoke portion layer. In this case, it is possible to form the layer adjacent to the coil insulating layer with accuracy.

According to the thin-film magnetic head or the method of manufacturing the same of the invention, at least a part of the thin-film coil may be located on a side of the first pole portion layer, and the second magnetic layer may be made up of one layer including the portion that defines the track width. In this case, since the at least part of the coil is located on the side of the first pole portion layer, it is possible that the second magnetic layer made up of the one layer is made flat or nearly flat, and the pole portion is formed with accuracy.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   a read head incorporating: a magnetoresistive element; and a first shield layer and a second shield layer for shielding the magnetoresistive element, the first and second shield layers having portions that are located on a side of the medium facing surface and opposed to each other, the magnetoresistive element being located between these portions; and
   a write head incorporating: a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers and insulated from the first and second magnetic layers; wherein:
   the first magnetic layer is located closer to the read head than the second magnetic layer;
   the first magnetic layer includes: a first pole portion layer that includes the pole portion of the first magnetic layer and has surfaces one of which is adjacent to the gap layer; and a first yoke portion layer that is a yoke portion of the first magnetic layer and connected to the other surface of the first pole portion layer; and
   an end of the first yoke portion layer that faces toward the medium facing surface is located at a distance from the medium facing surface, the thin-film magnetic head further comprising:
   an insulating layer for magnetically isolating the pole portions of the write head and the magnetoresistive element of the read head from each other, the insulating layer extending from the medium facing surface to the end of the first yoke portion layer that faces toward the medium facing surface, and having the same thickness as the first yoke portion layer.

2. The thin-film magnetic head according to claim 1 wherein the first pole portion layer includes a portion that has a width equal to a track width and that has an end located in the medium facing surface.

3. The thin-film magnetic head according to claim 1 wherein the first pole portion layer includes: a first portion that has a width equal to a track width and has an end located in the medium facing surface; and a second portion that has a width greater than the track width and is located farther from the medium facing surface than the first portion.

4. The thin-film magnetic head according to claim 1, further comprising: an insulating layer encasing portion in which a throat height defining insulating layer that defines a throat height is placed, the encasing portion being formed in the first pole portion layer; and the throat height defining insulating layer that is placed in the insulating layer encasing portion.

5. The thin-film magnetic head according to claim 1 wherein the at least part of the thin-film coil is located on a side of the first pole portion layer.

6. The thin-film magnetic head according to claim 5, further comprising a coil insulating layer that covers the at least part of the coil located on the side of the first pole portion layer and has a surface facing toward the gap layer, the surface being flattened together with the surface of the first pole portion layer adjacent to the gap layer.

7. The thin-film magnetic head according to claim 1 wherein:
   the second magnetic layer includes: a second pole portion layer that includes the pole portion of the second magnetic layer and has surfaces one of which is adjacent to the gap layer; and a second yoke portion layer that is a yoke portion of the second magnetic layer and connected to the other surface of the second pole portion layer; and an end of the second yoke portion layer that faces toward the medium facing surface is located at a distance from the medium facing surface.

8. The thin-film magnetic head according to claim 7 wherein each of the first and second pole portion layers includes a portion that has a width equal to a track width and has an end located in the medium facing surface.

9. The thin-film magnetic head according to claim 7 wherein at least one of the first and second pole portion layers includes: a first portion that has a width equal to a track width and has an end located in the medium facing surface; and a second portion that has a width greater than the track width and is located farther from the medium facing surface than the first portion.

10. The thin-film magnetic head according to claim 7, further comprising: an insulating layer encasing portion in which a throat height defining insulating layer that defines the throat height is placed, the encasing portion being formed in one of the first and second pole portion layers; and the throat height defining insulating layer that is placed in the insulating layer encasing portion.

11. The thin-film magnetic head according to claim 7 wherein the at least part of the thin-film coil is located on a side of the second pole portion layer.

12. The thin-film magnetic head according to claim 11, further comprising a coil insulating layer that covers the at least part of the coil located on the side of the second pole portion layer and has a surface facing toward the second yoke portion layer, the surface being flattened together with the surface of the second pole portion layer that faces toward the second yoke portion layer.

13. The thin-film magnetic head according to claim 1 wherein the at least part of the thin-film coil is located on a side of the first pole portion layer, and the second magnetic layer is made up of one layer including a portion that defines a track width.

14. A method of manufacturing a thin-film magnetic head comprising:
 a medium facing surface that faces toward a recording medium;
 a read head incorporating: a magnetoresistive element; and a first shield layer and a second shield layer for shielding the magnetoresistive element, the first and second shield layers having portions that are located on a side of the medium facing surface and opposed to each other, the magnetoresistive element being located between these portions; and
 a write head incorporating: a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers and insulated from the first and second magnetic layers; wherein:
  the first magnetic layer is located closer to the read head than the second magnetic layer; the method comprising the steps of:
  forming the read head;
  forming the first magnetic layer;
  forming the gap layer on the first magnetic layer;
  forming the second magnetic layer on the gap layer; and
  forming the coil such that the at least part of the coil is placed between the first and second magnetic layers and insulated from the first and second magnetic layers; wherein:
   the step of forming the first magnetic layer includes formation of: a first pole portion layer that includes the pole portion of the first magnetic layer and has surfaces one of which is adjacent to the gap layer; and a first yoke portion layer that is a yoke portion of the first magnetic layer and connected to the other surface of the first pole portion layer; wherein an end of the first yoke portion layer that faces toward the medium facing surface is located at a distance from the medium facing surface, the method further comprising:
   the step of forming an insulating layer for magnetically isolating the pole portions of the write head and the magnetoresistive element of the read head from each other, the insulating layer extending from the medium facing surface to the end of the first yoke portion layer that faces toward the medium facing surface, and having the same thickness as the first yoke portion layer.

15. The method according to claim 14 wherein the first pole portion layer includes a portion that has a width equal to a track width and that has an end located in the medium facing surface.

16. The method according to claim 14 wherein the first pole portion layer includes: a first portion that has a width equal to a track width and has an end located in the medium facing surface; and a second portion that has a width greater than the track width and is located farther from the medium facing surface than the first portion.

17. The method according to claim 14, further comprising the steps of: forming an insulating layer encasing portion in which a throat height defining insulating layer that defines the throat height is placed, the encasing portion being formed in the first pole portion layer; and forming the throat height defining insulating layer that is placed in the insulating layer encasing portion.

18. The method according to claim 14 wherein the at least part of the thin-film coil is located on a side of the first pole portion layer in the step of forming the coil.

19. The method according to claim 18, further comprising the step of forming a coil insulating layer that covers the at least part of the coil located on the side of the first pole portion layer and has a surface facing toward the gap layer, the surface being flattened together with the surface of the first pole portion layer adjacent to the gap layer.

20. The method according to claim 14 wherein the step of forming the second magnetic layer includes formation of: a second pole portion layer that includes the pole portion of the second magnetic layer and has surfaces one of which is adjacent to the gap layer; and a second yoke portion layer that is a yoke portion of the second magnetic layer and connected to the other surface of the second pole portion layer; wherein an end of the second yoke portion layer that faces toward the medium facing surface is located at a distance from the medium facing surface.

21. The method according to claim 20 wherein each of the first and second pole portion layers includes a portion that has a width equal to a track width and has an end located in the medium facing surface.

22. The method according to claim 20 wherein at least one of the first and second pole portion layers includes: a first portion that has a width equal to a track width and has an end located in the medium facing surface; and a second portion that has a width greater than the track width and is located farther from the medium facing surface than the first portion.

23. The method according to claim 20, further comprising the steps of: forming an insulating layer encasing portion in which a throat height defining insulating layer that defines the throat height is placed, the encasing portion being formed in one of the first and second pole portion layers; and forming the throat height defining insulating layer that is placed in the insulating layer encasing portion.

24. The method according to claim 20 wherein the at least part of the thin-film coil is located on a side of the second pole portion layer in the step of forming the coil.

25. The method according to claim 24, further comprising the step of forming a coil insulating layer that covers the at least part of the coil located on the side of the second pole portion layer and has a surface facing toward the second yoke portion layer, the surface being flattened together with the surface of the second pole portion layer that faces toward the second yoke portion layer.

26. The method according to claim 14 wherein:

the at least part of the thin-film coil is located on a side of the first pole portion layer in the step of forming the coil; and the second magnetic layer is made up of one layer including a portion that defines a track width.

* * * * *